(12) United States Patent
Chen et al.

(10) Patent No.: US 12,266,975 B2
(45) Date of Patent: Apr. 1, 2025

(54) ROTOR AND DESIGN METHOD THEREOF

(71) Applicant: National Ilan University, Yilan County (TW)

(72) Inventors: Cheng-Hu Chen, Yilan County (TW); Yu-Cheng Yao, Yilan County (TW); Ruey-Yue Lin, Yilan County (TW)

(73) Assignee: National Ilan University, Yilan County (TW)

( * ) Notice: Subject to any disclaimer, the term of this patent is extended or adjusted under 35 U.S.C. 154(b) by 285 days.

(21) Appl. No.: 17/952,444

(22) Filed: Sep. 26, 2022

(65) Prior Publication Data
US 2023/0387736 A1 Nov. 30, 2023

(30) Foreign Application Priority Data
May 26, 2022 (TW) .................................. 111119757

(51) Int. Cl.
*H02K 1/24* (2006.01)
*G06F 30/17* (2020.01)
*G06F 111/10* (2020.01)

(52) U.S. Cl.
CPC ............. *H02K 1/246* (2013.01); *G06F 30/17* (2020.01); *G06F 2111/10* (2020.01); *H02K 2213/03* (2013.01)

(58) Field of Classification Search
CPC ............ H02K 1/22; H02K 1/24; H02K 1/246; H02K 1/27; H02K 1/28; H02K 1/30;
(Continued)

(56) References Cited

U.S. PATENT DOCUMENTS 2,975,310 A * 3/1961 Armstrong ............. H02K 19/14
310/211
7,102,259 B2 * 9/2006 Kawaguchi ........ H02K 15/0012
310/60 A
(Continued)

FOREIGN PATENT DOCUMENTS

CN 108736601 A 11/2018
CN 112671127 A 4/2021
(Continued)

OTHER PUBLICATIONS

Yammine Samer et al, "Synchronous reluctance machine flux barrier design based on the flux line patterns in a solid rotor", 2014 International Conference on Electrical Machines (ICEM), IEEE, Sep. 2, 2014, pp. 297-302.
(Continued)

*Primary Examiner* — Tran N Nguyen

(57) ABSTRACT

A motor rotor includes a rotor core and a plurality of reluctance parts. The rotor core includes a plurality of metal parts and an inner hole for the motor rotor, the inner hole of the motor rotor passes through the rotor core, and the areas of the metal parts form a rotor metal total area $\Sigma A_{metal}$. The plurality of reluctance parts are disposed surrounding the inner hole of the motor rotor, each of the reluctance parts comprising a plurality of flux barriers penetrating through the rotor core. The areas of the flux barriers in all the reluctance parts form a flux barrier total area $\Sigma A_{air}$. The sum of $\Sigma A_{air}$ and $\Sigma A_{metal}$ is a rotor effective total area, and the ratio of $\Sigma A_{air}$ to the rotor effective total area is a flux barrier ratio $K_A$, which is expressed as $$K_A = \frac{\sum A_{air}}{\sum A_{air} + \sum A_{metal}},$$

and satisfies $0.25 \leq K_A \leq 0.5$.

9 Claims, 19 Drawing Sheets

(58) Field of Classification Search
CPC ........ H02K 17/16; H02K 17/20; H02K 19/02; H02K 19/10; H02K 19/103; H02K 19/14; H02K 15/00; H02K 15/001; H02K 15/02; H02K 15/022
See application file for complete search history.

(56) References Cited

U.S. PATENT DOCUMENTS

| | | | |
|---|---|---|---|
| 8,749,109 B2 * | 6/2014 | Lendenmann | ......... H02K 1/246 310/216.106 |
| 2015/0015093 A1 | 1/2015 | Gontermann et al. | |

FOREIGN PATENT DOCUMENTS

| | | | | |
|---|---|---|---|---|
| CN | 113675968 | A | 11/2021 | |
| EP | 3288160 | B1 | 12/2019 | |
| JP | 5866074 | B1 | 2/2016 | |
| JP | 2017527247 | A | 9/2017 | |
| JP | 2020182264 | A | 11/2020 | |
| TW | M566435 | U | 9/2018 | |
| WO | WO2008123636 | A1 * | 10/2008 | ............... H02K 1/22 |
| WO | 2016171021 | A1 | 10/2016 | |
| WO | 2018159339 | A | 9/2018 | |
| WO | 2018220806 | A | 12/2018 | |

OTHER PUBLICATIONS

EP 22201941.6, European Search Report, issued on May 12, 2023.

* cited by examiner

ROTOR AND DESIGN METHOD THEREOF

CROSS-REFERENCE TO RELATED APPLICATION

This application claims the priority of Taiwanese patent application No. 111119757, filed on May 26, 2022, which is incorporated herewith by reference.

BACKGROUND OF THE INVENTION

1. Field of the Invention

The present invention relates generally to a rotor and design method thereof, and more particularly, to a rotor structure of reluctance motor and design method thereof.

2. The Prior Arts

The reluctance motor is a synchronous motor, which uses the torque generated by the uneven reluctance of the rotor to work. The rotor is composed of metal magnetic materials and non-metallic magnetic materials. The rotor has no permanent magnets and no windings, and is one of the simplest motor structures.

In the structure of the reluctance motor, the flux barrier is the most important structure that affects the performance of the entire rotor. However, the structure of the flux barrier is defined by various parameters, such as length, angle, position, etc., wherein each parameter further comprises various detailed design parameters, and the parameters are coupled with each other and have a significant impact on the motor output characteristics. Therefore, the pros and cons of the rotor design of the reluctance motor will directly be reflected in the overall performance of the motor.

In the known motor rotor structure and design method, most designers need to iterate the process of designing and verification of the reluctance motor, and the designed motor rotor structure can only be obtained through a very long design and verification process with many iterations.

SUMMARY OF THE INVENTION

Problems to be Solved by the Invention

As seen from the above-mentioned prior art, the current design process of the motor rotor is very lengthy, resulting in long time and high cost, and it is also impossible to provide a motor rotor structure that can effectively improve the performance of the motor. Therefore, it is necessary to provide a new motor rotor structure and a design method thereof, so that the motor can achieve the best performance and give the best range of key parameters in the design process, so that the designer can greatly reduce the design time.

Technical Means to Solve the Problem

A motor rotor includes a rotor core and a plurality of reluctance parts. The rotor core includes a plurality of metal parts and an inner hole for the motor rotor, the inner hole of the motor rotor passes through the rotor core, and the areas of the metal parts form a rotor metal total area $\Sigma A_{metal}$. The plurality of reluctance parts are disposed surrounding the inner hole of the motor rotor, each of the reluctance parts comprising a plurality of flux barriers penetrating through the rotor core. The areas of the flux barriers in all of the reluctance parts form a flux barrier total area $\Sigma A_{air}$. The sum of the flux barrier total area $\Sigma A_{air}$ and the rotor metal total area $\Sigma A_{metal}$ is a rotor effective total area, and the ratio of the flux barrier total area $\Sigma A_{air}$ to the rotor effective total area is a flux barrier ratio $K_A$, which is expressed as $$K_A = \frac{\sum A_{air}}{\sum A_{air} + \sum A_{metal}},$$

and satisfies the following relation: $0.25 \leq K_A \leq 0.5$.

Preferably, the motor rotor corresponds to a motor stator, the motor stator comprises a motor pole number P, each of the reluctance parts comprises a q-axis, the q-axis is connected to a center of the inner hole of the rotor, each of the reluctance parts comprises a plurality of the flux barriers, the total number of the flux barriers is K, K is any natural number greater than 1, and in each of the reluctance parts, the flux barriers are arranged symmetrically on the q-axis, and the flux barriers comprise a flux barrier area ratio difference AP between each other, and the flux barrier area ratio difference AP conforms to the following relation $$\frac{P}{K} \times 15 - 9 \leq AP \leq \frac{P}{K} \times 15 - 3.$$

Preferably, the motor rotor has a diameter $R_1$, the inner hole of the rotor has a diameter $R_2$, each of the reluctance parts has a q-axis, the q-axis is connected to a center of the inner hole of the rotor, each of the reluctance parts comprises a plurality of the flux barriers, and in each of the reluctance parts, the flux barrier which is closest to the inner hole of the rotor is defined as a closest flux barrier, the q-axis passes through a closest flux barrier center of the closest flux barrier, the closest flux barrier center and the center of the inner hole of the rotor define a center distance C, the center distance C comprises a center distance coefficient CD, the formula of the center distance C is $$C = \frac{CD \cdot R_1 + (1 - CD)R_2}{2},$$

the center distance coefficient CD conforms to the following relation: $0.15 \leq CD \leq 0.3$.

Preferably, each of the reluctance parts has a q-axis connected to a center of the inner hole of the rotor, each of the reluctance parts comprises a plurality of the flux barriers, the number of the flux barriers is K, K is any natural number, and in each of the reluctance parts, the K-th flux barrier of the flux barriers has a K-th flux barrier end, the (K−1)th flux barrier has a (K−1)th flux barrier end, the distance between the K-th flux barrier end and the (K−1)th flux barrier end is a distance $A_{K-1}$, and the q-axis passes through a K-th flux barrier center of the K-th flux barriers, the q-axis passes through a (K−1)-th flux barrier center of the (K−1)th flux barrier, the distance between the K-th flux barrier center and the K-th flux barrier center is a distance $B_{K-1}$, and the distance $A_{K-1}$ is equal to the distance $B_{K-1}$.

On the other hand, the present invention also provides a method for designing a motor rotor, comprising the steps of: calculating a rotor metal total area $\Sigma A_{metal}$ in the motor rotor; calculating a flux barrier total area $\Sigma A_{air}$ in the motor rotor; and setting a flux barrier ratio $K_A$ of the motor rotor satisfying the following relation: $0.25 \leq K_A \leq 0.5$, wherein the formula of the flux barrier ratio $K_A$ is $$K_A = \frac{\sum A_{air}}{\sum A_{air} + \sum A_{metal}}.$$

Furthermore, the design method of the present invention further comprises the following steps: setting a motor pole number P corresponding to the motor rotor; setting each of the plurality of reluctance parts in the motor rotor to comprise a plurality of flux barriers, wherein the number of flux barriers is K, and K is any natural number greater than 1; and the flux barriers are set to comprise a flux barrier area ratio difference AP between each other, and the flux barrier area ratio difference AP conforms to the following relation:

$$\frac{P}{K} \times 15 - 9 \leq AP \leq \frac{P}{K} \times 15 - 3.$$

Furthermore, the design method of the present invention further comprises the following steps: setting the number of the reluctance parts in the motor rotor to a plurality; setting the number of the flux barriers comprised in each of the reluctance parts to a plurality, wherein, preferably, the motor rotor comprises a diameter $R_1$, the inner hole of the rotor comprises a diameter $R_2$, each of the reluctance parts comprises a q-axis, the q-axis is connected to a center of the inner hole of the rotor, each of the reluctance parts comprises a plurality of the flux barriers, and in each of the reluctance parts, the flux barrier which is closest to the inner hole of the rotor is defined as a closest flux barrier, the q-axis passes through a closest flux barrier center of the closest flux barrier, the closest flux barrier center and the center of the inner hole of the rotor define a center distance C, the center distance C comprises a center distance coefficient CD, the formula of the center distance C is $$C = \frac{CD \cdot R_1 + (1 - CD)R_2}{2},$$

the center distance coefficient CD conforms to the following relation: $0.15 \leq CD \leq 0.3$.

Furthermore, the design method of the present invention further comprises the following steps: setting the number of reluctance parts in the motor rotor to be plural; setting each of the plurality of reluctance parts in the motor rotor to comprise a plurality of flux barriers, wherein the number of flux barriers is K, and K is any natural number; setting a q-axis in each of the reluctance parts, and the q-axis is connected to a center of the motor rotor; in each of the reluctance parts, setting the K-th flux barrier of the flux barriers to have a K-th flux barrier end; setting the (K−1)th flux barrier to have a (K−1)th flux barrier end, wherein the distance between the K-th flux barrier end and the (K−1)th flux barrier end is a distance $A_{K-1}$; in each of the reluctance parts, setting the center point where the q-axis passing through the center of the K-th flux barrier as a K-th flux barrier center; setting the center point where the q-axis passing through the (K−1)th flux barrier as a (K−1)-th flux barrier center, wherein the distance between the K-th flux barrier center and the K-th flux barrier center is a distance $B_{K-1}$; and setting the distance $A_{K-1}$ to be equal to the distance $B_{K-1}$, the distance A2 to be equal to the distance B2, the distance A1 to be equal to the distance B1.

Furthermore, the design method of the present invention further comprises the following steps: setting a motor stator corresponding to the motor rotor to comprise a motor pole number P and a stator slot number $N_s$; setting the number of stator slots comprised in each pole of the motor stator $n_{PPS}$, the formula of the number of stator slots $n_{PPS}$ is $$n_{PPS} = \frac{N_s}{P};$$

setting the number of reluctance parts in the motor rotor to be a plurality; and setting the number K of flux barriers comprised in each of the reluctance parts to conform to the following:

$$\left\lfloor \frac{n_{PPS} - 2}{2} \right\rfloor \leq K \leq \left\lfloor \frac{n_{PPS} + 2}{2} \right\rfloor,$$

where K is a natural number.

Preferably, the type of the motor rotor is one of C-type rotors, U-type rotors, hybrid rotors or other types of rotors.

Effects of the Invention

As seen from the above, the present invention provides a novel motor rotor structure and a new motor rotor design method. The present invention can design the structure according to the following features of the motor rotor and provide corresponding design method: 1. the flux barrier ratio of the motor rotor; 2. the area ratio difference of the flux barriers between each flux barrier in the motor rotor; 3. the center distance between the center of the nearest shaft flux barrier in the motor rotor and the center of the motor rotor; 4. the distance between the end of the flux barrier in the motor rotor and the center of the flux barrier; 5. the number of flux barriers comprised in each reluctance part in the motor rotor. After improving the structure according to the above characteristics and providing the corresponding design method, the output power per unit volume of the motor can be effectively improved, the torque ripple can be effectively reduced, and the vibration caused by the torque fluctuation of the motor can be reduced. Furthermore, the design method of the present invention is simple and effective, which can greatly reduce the design time, and effectively improve the power density of the motor and reduce the torque ripple. The design achieves the maximum benefit in the shortest time, so that the motor rotor and the reluctance motor have the optimal performance.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are comprised to provide a further understanding of the invention, and are incorporated in and constitute a part of this specification. The drawings illustrate embodiments of the invention and, together with the description, serve to explain the principles of the invention.

Figure 1:
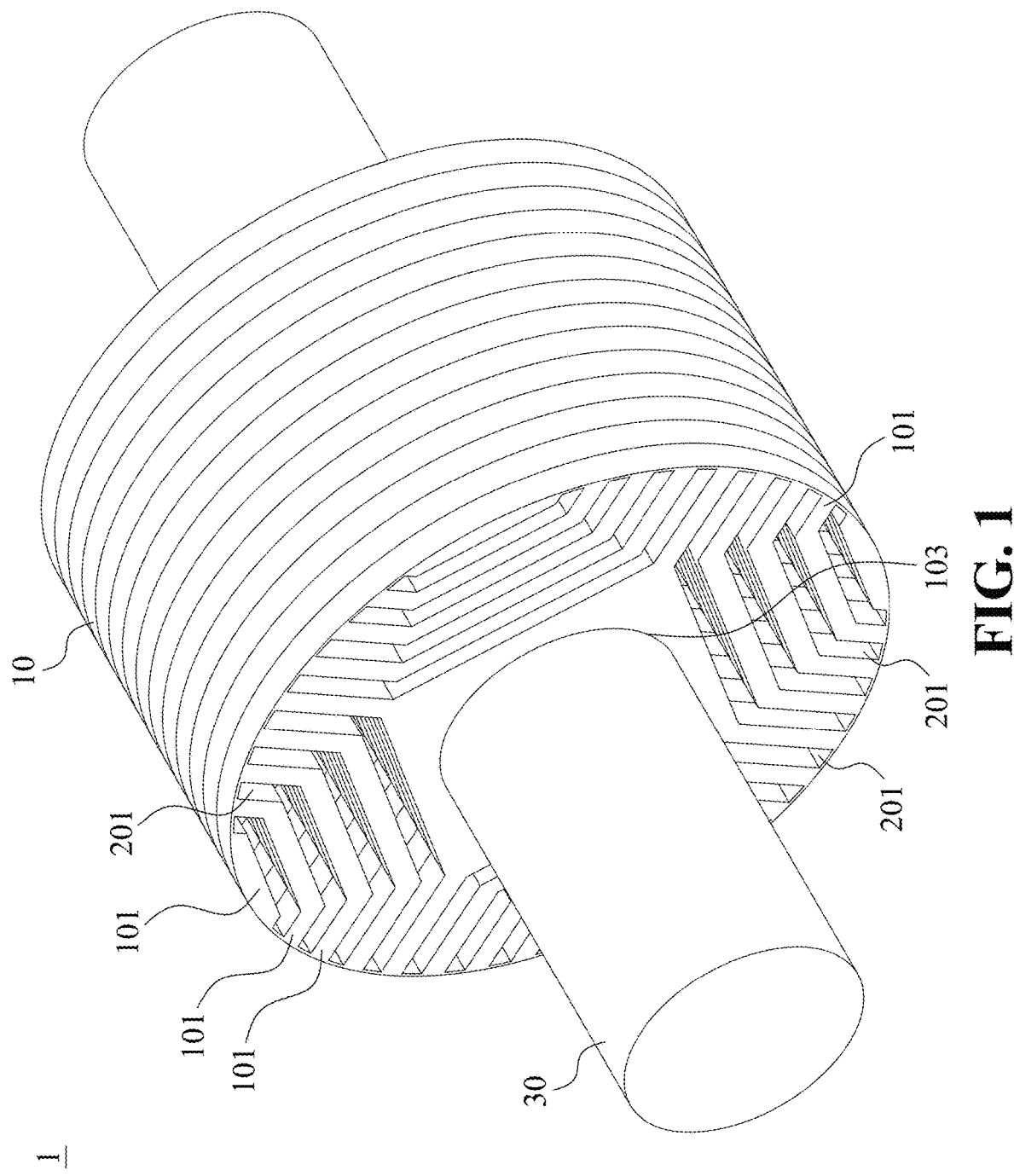
FIG. 1 is a schematic structural view of a U-type motor rotor according to an embodiment of the present invention.
Figure 2:
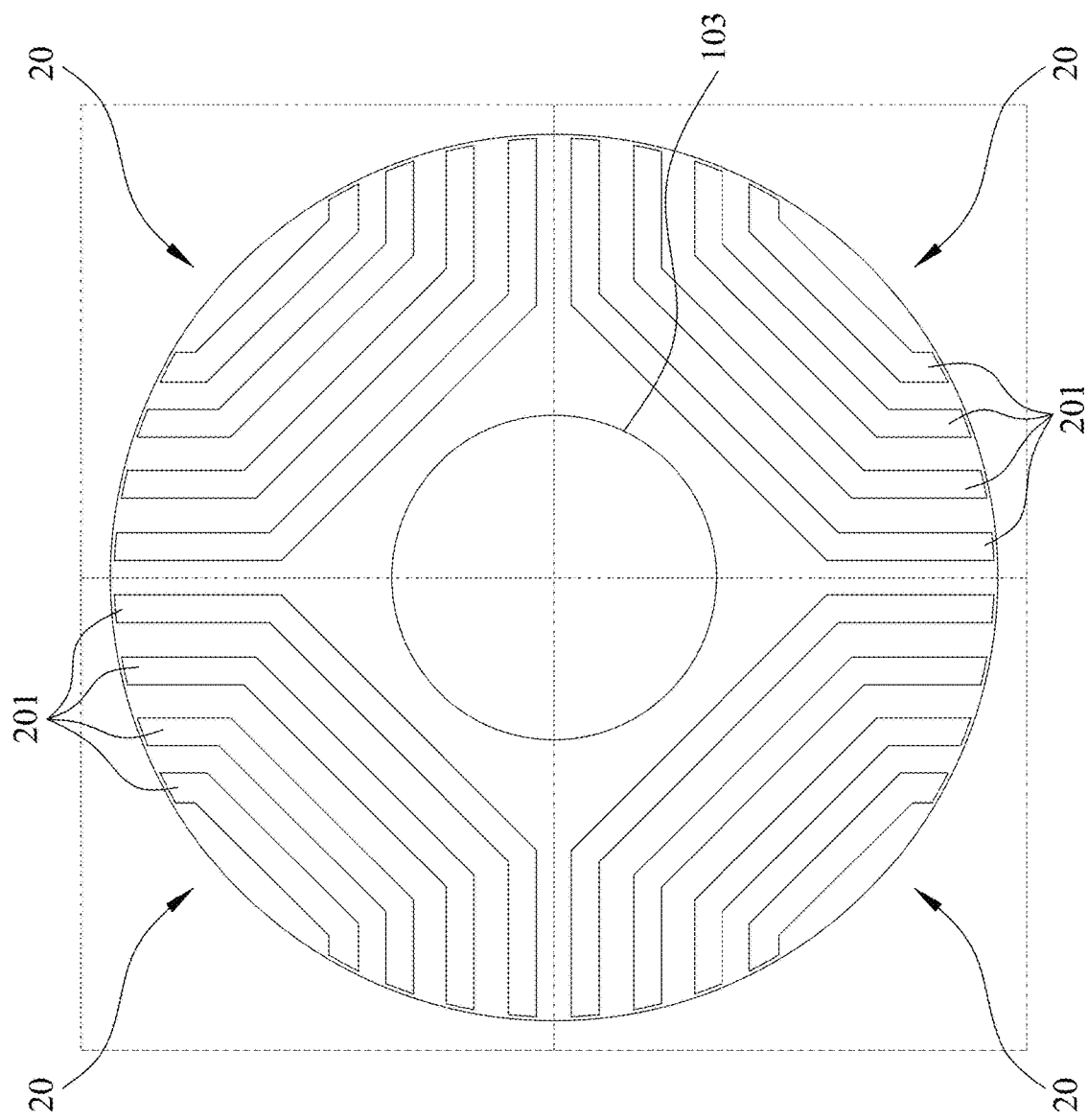
FIG. 2 is a schematic front view of the structure of a U-type motor rotor according to an embodiment of the present invention.
Figure 3:
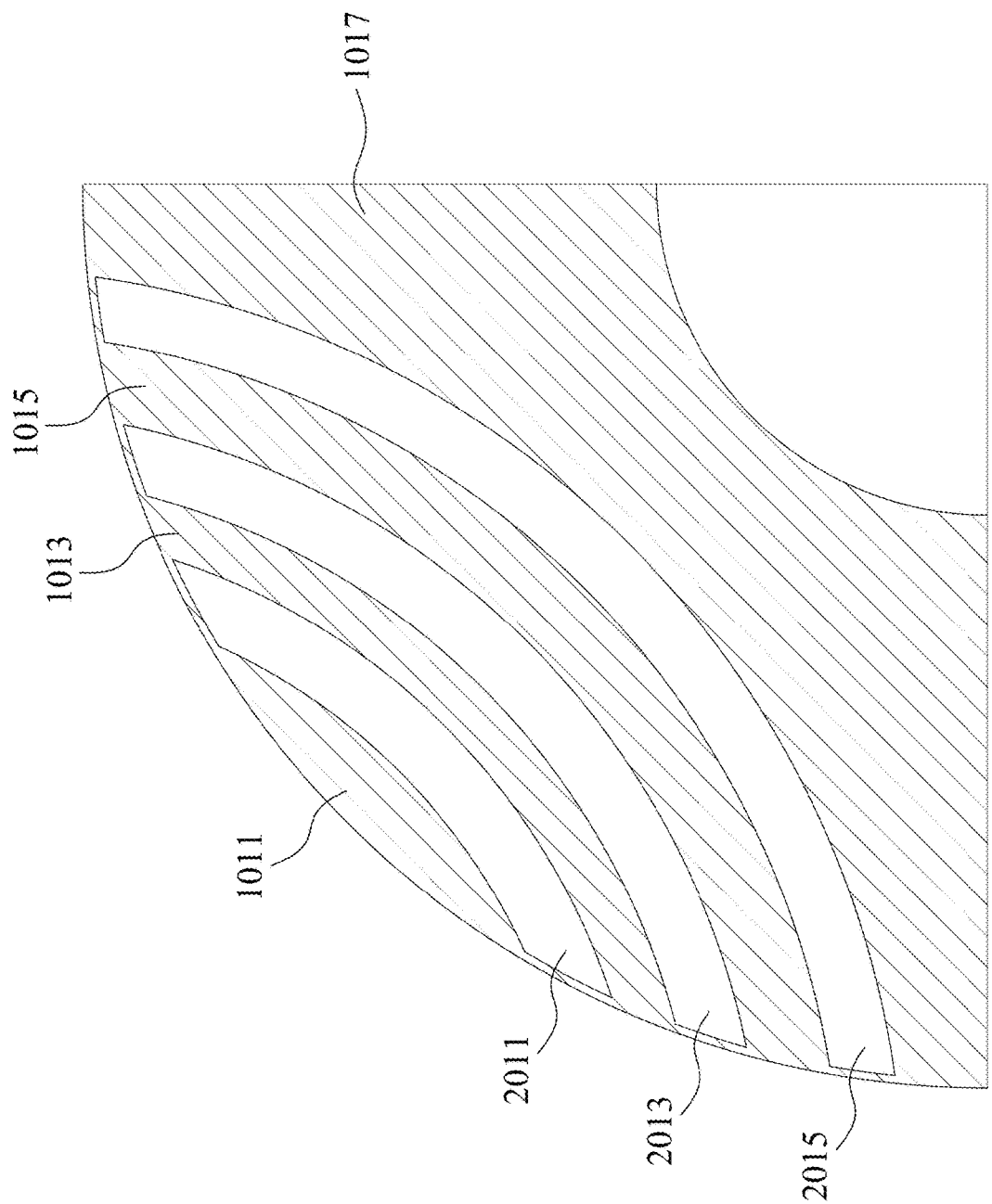
FIG. 3 is a schematic structural view of a reluctance part in a C-type motor rotor according to an embodiment of the present invention.

FIG. 1 is a schematic view for illustrating the structure of a motor rotor according to an embodiment of the present invention; FIG. 2 is a front view for illustrating the structure of a motor rotor according to an embodiment of the present invention; FIG. 3 is a schematic view for illustrating the structure of a reluctance part in the motor rotor according to an embodiment of the present invention. Referring to FIGS. 1 to 3, in an embodiment of the present invention, the motor rotor 1 includes a rotor core 10 and a plurality of reluctance parts 20. The rotor core 10 includes a plurality of metal parts 101 and an inner hole 103 of the motor rotor, the inner hole 103 of the motor rotor penetrates through the rotor core 10, and a rotating shaft 30 is disposed in the inner hole 103 of the motor rotor. The reluctance parts 20 are arranged around the inner hole 103 of the motor rotor, and each reluctance part 20 includes a plurality of flux barriers 201 that penetrates through the rotor core 10, so that the flux barrier 201 refers to the hollowed out part of the rotor core 10. The rotor core 10 may be formed by stacking a plurality of metal steel sheets, and the material of the metal parts 101 of the rotor core 10 may be iron, steel or other magnetically conductive metal materials, and the metal steel sheets refer to soft magnetic material sheets, such as, silicon steel sheets, steel sheets, and so on.

In the motor rotor 1, one rotor pole includes one reluctance part 20, so the motor rotor 1 shown in FIGS. 1 and 2 includes four rotor poles and four reluctance parts 20. It should be understood that the number of rotor poles and reluctance parts 20 can be adjusted according to actual needs. In addition, although each reluctance part 20 includes a plurality of flux barriers 201 in FIGS. 1 and 2 and each flux barrier 201 is spaced apart from each other, but it also is possible to configure each reluctance part 20 to include only one flux barrier 201. Therefore, the number of flux barriers 201 may be one, two, three or more.

In an embodiment of the present invention, the areas of all the metal parts 101 form a rotor metal total area $\Sigma A_{metal}$, and the areas of the flux barriers 201 of all the reluctance parts 20 form a flux barrier total area $\Sigma A_{air}$. Taking a reluctance part 20 shown in FIG. 3 as an example, the total area of the metal part 1011, the metal part 1013, the metal part 1015, and the metal part 1017 is the rotor metal total area of the reluctance part 20, the total area of the flux barrier 2011, the flux barriers 2013, and 2015 is the flux barriers total area of a reluctance part 20, and the total area of all the metal parts 101 in all the reluctance parts 20 is $\Sigma A_{metal}$, the total area of all flux barriers 201 in all reluctance parts 20 is $\Sigma A_{air}$. The sum of the flux barrier total area $\Sigma A_{air}$ and the rotor metal total area $\Sigma A_{metal}$ is the total effective area of the rotor, and the ratio of the flux barrier total area $\Sigma A_{air}$ to the total effective area of the rotor is a flux barrier ratio $K_A$. The value of the flux barrier ratio $K_A$ is given to a specific range, and the formula of the flux barrier ratio $K_A$ is $$K_A = \frac{\sum A_{air}}{\sum A_{air} + \sum A_{metal}},$$

and the flux barrier ratio $K_A$ of the present invention must meet the following relation $0.25 \leq K_A \leq 0.5$. When the flux barrier ratio $K_A$ in the motor rotor 1 complies with the relation $0.25 \leq K_A < 0.5$, the torque of the entire motor rotor 1 is maximized and the torque ripple is minimized, thereby allowing the motor rotor 1 to achieve the maximum performance.

Figure 4:
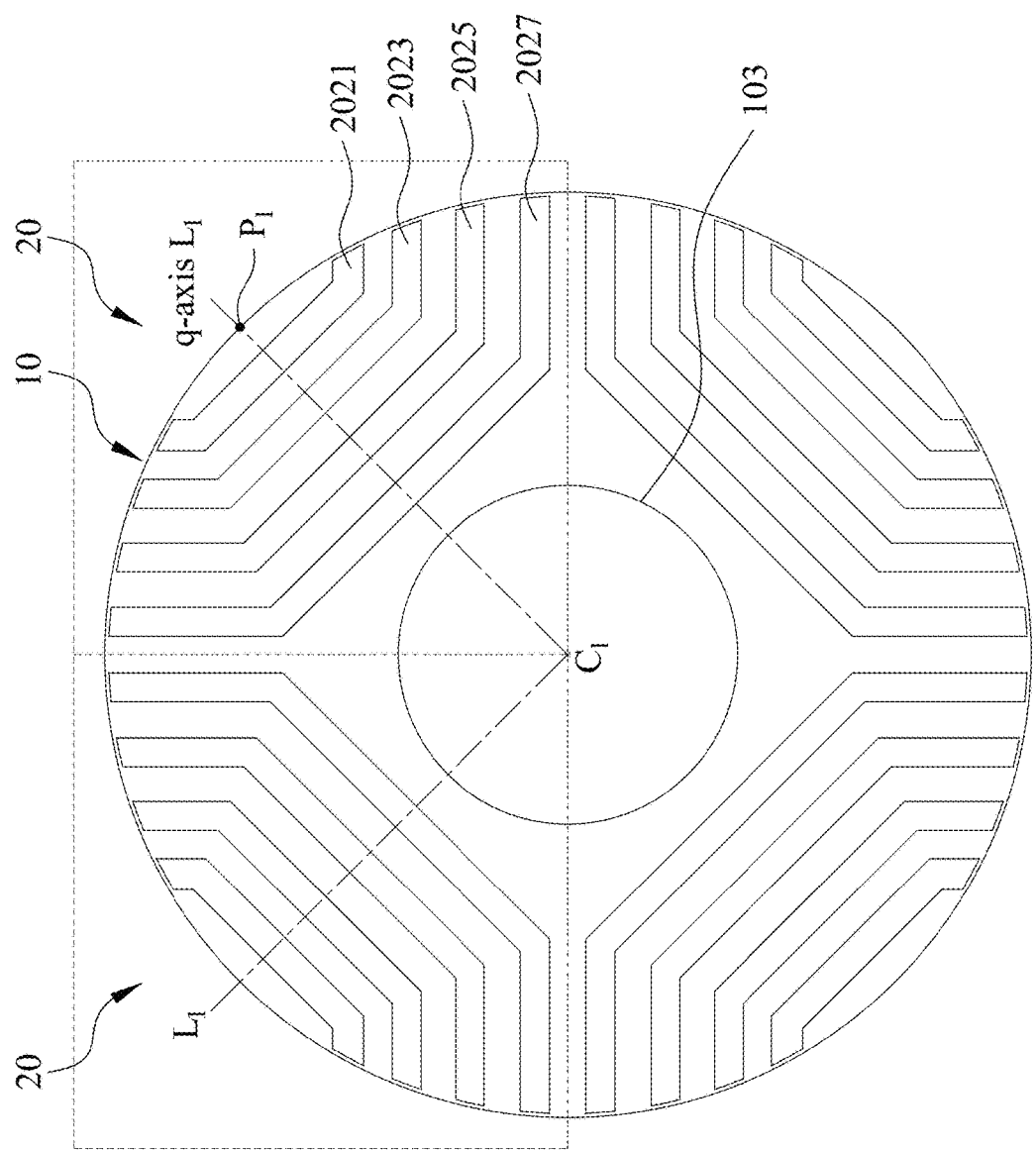
FIG. 4 is a schematic structural view of the area of a flux barrier in a U-type motor rotor according to an embodiment of the present invention.

FIG. 4 is a schematic view for illustrating the structure of the flux barrier area in the motor rotor according to an embodiment of the present invention. Referring to FIGS. 1, 2, and 4, in an embodiment of the present invention, the motor rotor 1 corresponds to a motor stator 40 (shown in FIG. 9). The motor stator 40 includes a motor pole number P, and each reluctance part 20 includes a q-axis L1, the q-axis L1 is connected to a center C1 of the inner hole 103 of the motor rotor and a middle point P1 on a peripheral edge of the rotor core 10; each reluctance part 20 comprises a plurality of flux barriers 201. Assume that there are K flux barriers 201, wherein K is any natural number greater than 1. Taking FIG. 4 as an example, the number of flux barriers 201 in each reluctance part 20 is set to four, such as flux barrier 2021, flux barrier 2023, flux barrier 2025, and flux barrier 2027. In a reluctance part 20, the flux barrier 2021, the flux barrier 2023, the flux barrier 2025, and the flux barrier 2027 are arranged symmetrically on the q-axis L1, and the flux barrier 2021, the flux barrier 2023, the flux barrier 2025, and the flux barrier 2027 include a flux barrier area ratio difference AP, and the flux barrier area ratio difference AP conforms to the following relation $$\frac{P}{K} \times 15 - 9 \le AP \le \frac{P}{K} \times 15 - 3.$$

Taking the motor pole number P in FIG. 4 as 4 poles, and a reluctance part 20 including four flux barriers 2021, 2023 2025, and 2027 as an example, the flux barrier area ratio difference is AP. that is, $$\frac{4}{4} \times 15 - 9 \le AP \le \frac{4}{4} \times 15 - 3,$$

so 6≤AP≤12.

Specifically, the area ratio of the flux barrier 2021, the flux barrier 2023, the flux barrier 2025, and the flux barrier 2027 needs to increase sequentially along the direction from the periphery of the motor rotor 1 to the inner hole 103 of the motor rotor, and the ratios need to be an arithmetic progression sequence. The sequence means that the outermost flux barrier 2021 has the smallest area, and the flux barrier 2027 closest to the inner hole 103 of the motor rotor has the largest area. In other words, the area of the flux barrier 2027>the area of the flux barrier 2025>the area of the flux barrier 2023>the area of the flux barrier 2021. Furthermore, the ratio of the area of the flux barrier 2021 to the flux barrier total area of a reluctance part 20 (i.e., the total area of the flux barrier 2021, the flux barrier 2023, the flux barrier 2025, and the flux barrier 2027) plus the aforementioned flux barrier area ratio difference AP is equal to the ratio of the flux barriers 2023 to the flux barrier total area of a reluctance part 20, and the area ratios of the remaining flux barriers 2025 and 2027 are similar. In addition, under this area ratio structure, the area ratio of the flux barrier can be fine-tuned, about ±3%, so that the motor rotor 1 can achieve better performance.

Figure 5:
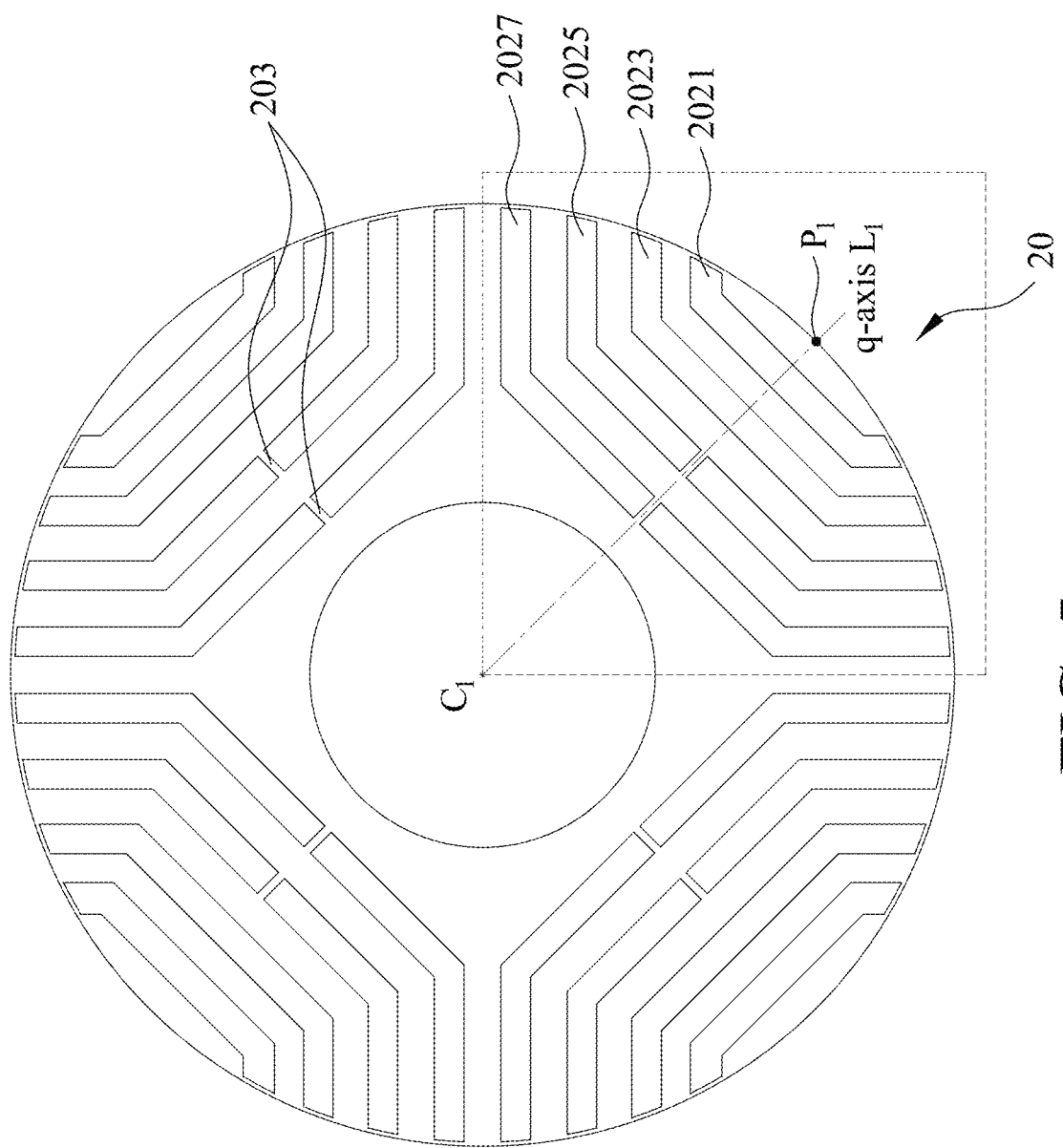
FIG. 5 is a schematic structural view of the area of a flux barrier in a U-type motor rotor according to another embodiment of the present invention.

FIG. 5 is a schematic view for explaining the structure of the area of the flux barrier in the motor rotor according to another embodiment of the present invention. Referring to FIG. 1, FIG. 2, and FIG. 5, in another embodiment of the present invention, a rib 203 is provided on the flux barrier 201, the rib 203 is located on the q-axis L1, the flux barrier 2021, the flux barrier 2023, the flux barrier 2025, and the flux barrier 2027 are disposed symmetrically to the q-axis L1 and the rib 203, and the rib 203 can strengthen the structure of the motor rotor 1 and improve the rotation effect. In addition, in the structure provided with the rib 203, the flux barrier 2021, the flux barrier 2023, the flux barrier 2025, and the flux barrier 2027 have the aforementioned flux barrier area ratio difference AP.

Figure 6A:
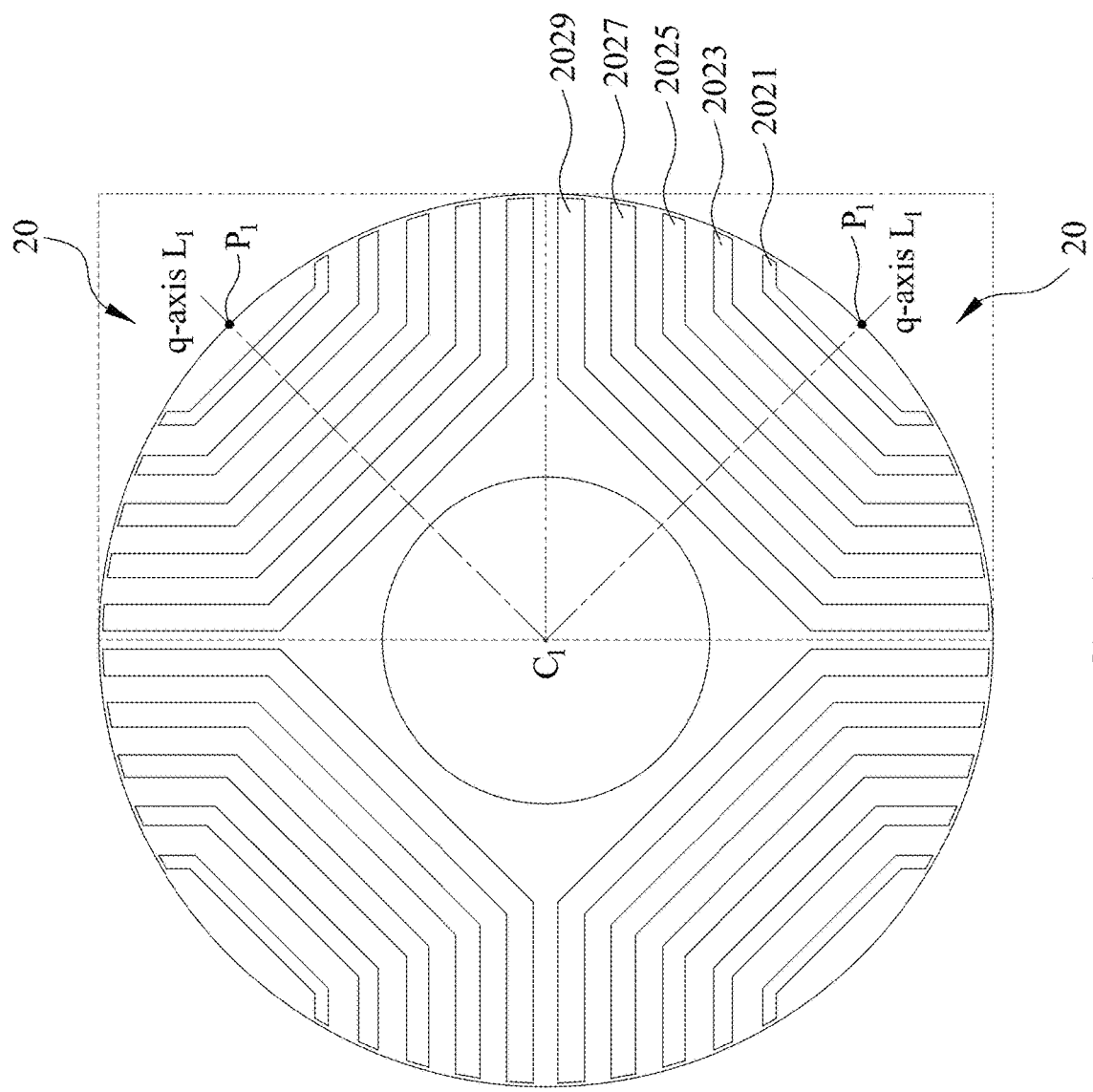
FIG. 6a is a schematic structural view of a U-type motor rotor according to another embodiment of the present invention.

FIG. 6a is a schematic view for illustrating the structure of a motor rotor according to another embodiment of the present invention. Referring to FIG. 1, FIG. 2, and FIG. 6a, in another embodiment of the present invention, the number of flux barriers 201 in each reluctance part 20 is set to five, such as flux barrier 2021, flux barrier 2023, flux barrier 2025, flux barrier 2027, and flux barrier 2029, and in each reluctance part 20, the flux barrier 2021, the flux barrier 2023, the flux barrier 2025, the flux barrier 2027, and the flux barrier 2029 are arranged symmetrically to the q-axis L1, and the flux barrier 2021, the flux barrier 2023, the flux barrier 2025, the flux barrier 2027, and the flux barrier 2029 have the flux barrier area ratio difference AP. The flux barrier area ratio difference AP conforms to the following relation $$\frac{P}{K} \times 15 - 9 \le AP \le \frac{P}{K} \times 15 - 3.$$

The flux barrier 2021, the flux barrier 2023, the flux barrier 2025, the flux barrier 2027, and the flux barrier 2029 are U-type flux barriers.

Figure 6B:
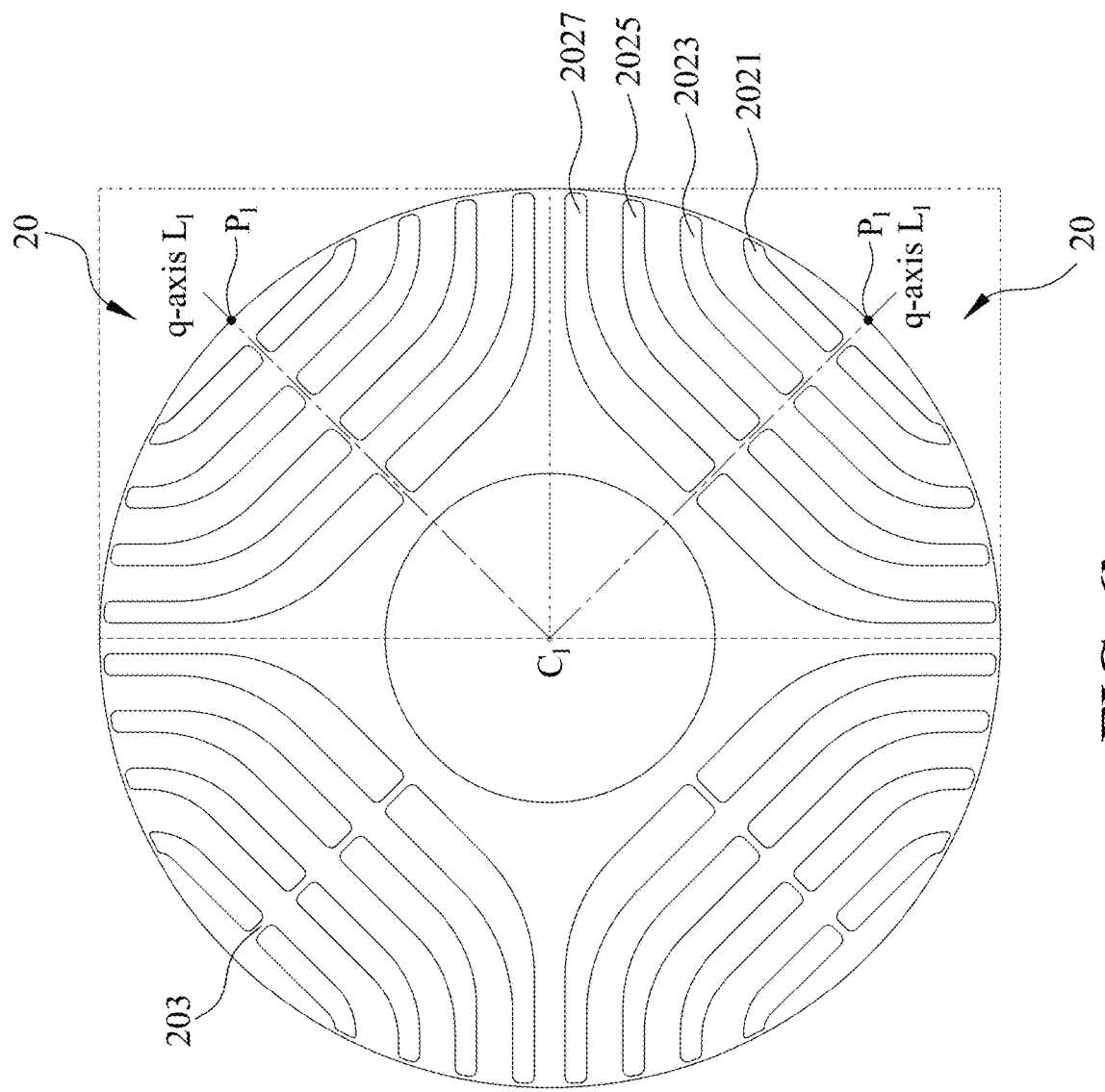
FIG. 6b is a schematic structural view of a U-type motor rotor according to yet another embodiment of the present invention.

FIG. 6b is a schematic view for illustrating the structure of a motor rotor according to still another embodiment of the present invention. Referring to FIG. 1, FIG. 2 and FIG. 6b, in another embodiment of the present invention, similarly, the flux barrier 2021, the flux barrier 2023, the flux barrier 2025, and the flux barrier 2027 in each reluctance part 20 are arranged symmetrically on the q-axis L1, and the rib 203 may also be provided in the reluctance part 20. The flux barrier 2021, the flux barrier 2023, the flux barrier 2025, and the flux barrier 2027 are U-type flux barriers including arc guide angles. The flux barrier 2021, the flux barrier 2023, the flux barrier 2025, and the flux barrier 2027 also have a flux barrier area ratio difference AP among themselves.

Figure 6C:
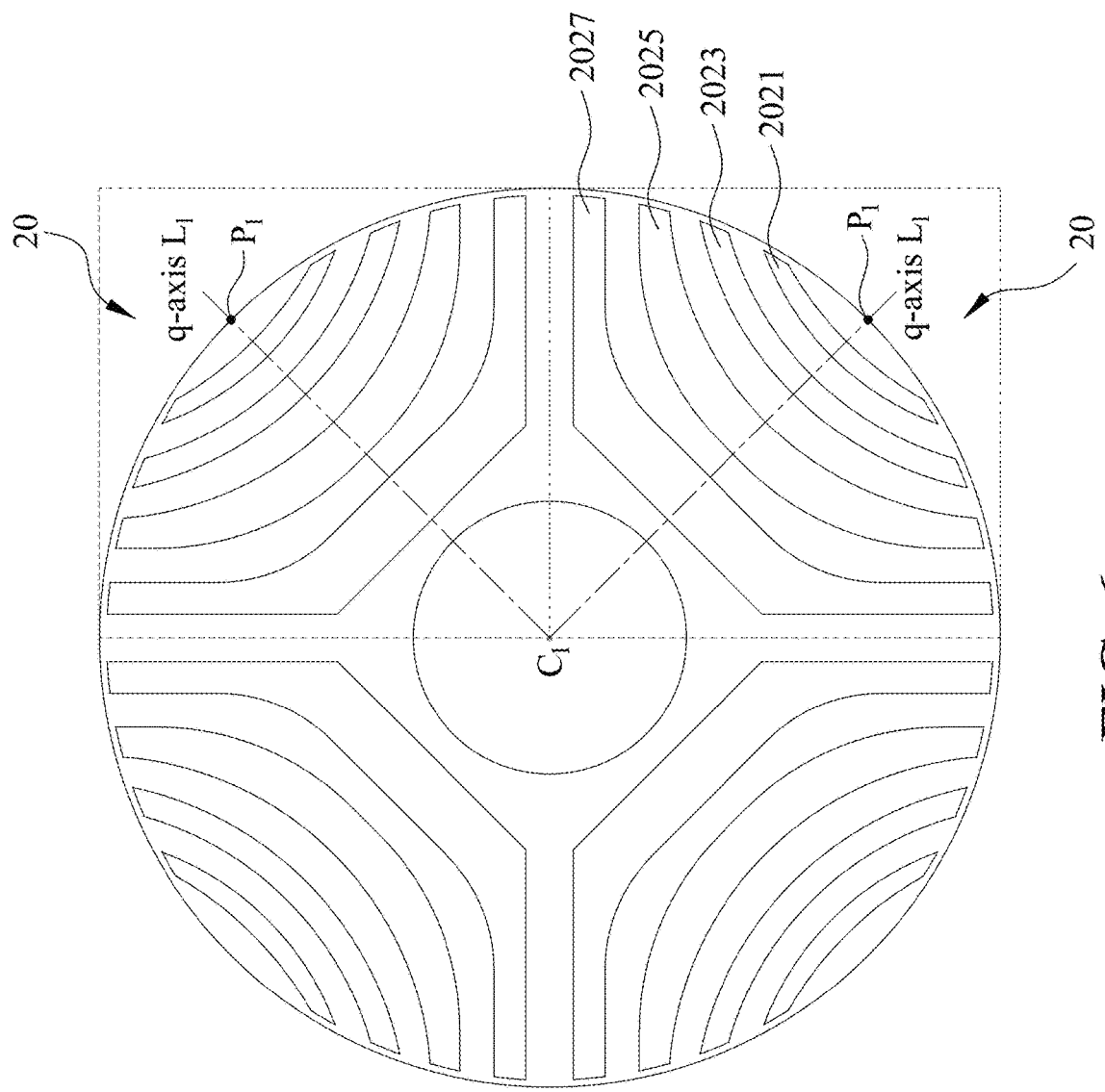
FIG. 6c is a schematic structural view of a hybrid motor rotor according to yet another embodiment of the present invention.

FIG. 6c is a schematic view for illustrating the structure of a motor rotor according to yet another embodiment of the present invention. Referring to FIG. 1, FIG. 2, and FIG. 6c, in yet another embodiment of the present invention, similarly, the flux barrier 2021, the flux barrier 2023, the flux barrier 2025, and the flux barrier 2027 in each reluctance part 20 are arranged symmetrically on the q-axis L1. The flux barrier 2021, the flux barrier 2023, and the flux barrier 2025 are C-type flux barriers, and the flux barrier 2027 is a U-type flux barrier. In other words, the flux barrier 2021, the flux barrier 2023, the flux barrier 2025, and the flux barrier 2027 are hybrid flux barriers, and the flux barrier 2021, the flux barrier 2023, the flux barrier 2025, and the flux barrier 2027 have the flux barrier area ratio difference AP among themselves.

It can be seen from the aforementioned various rotor types of the present invention that for reluctance motor rotors with different shapes of flux barriers or different numbers of flux barriers in each reluctance part, such as a C-type rotor, a U-type rotor or a hybrid rotor, The number of flux barriers in each reluctance part is two, three, four, five or six, etc., all of which can improve performance of the motor without additional means (such as adding permanent magnets in the reluctance part) or other complicated mechanisms, including output power density, reduce torque ripple, and then achieve the best rotor structure, design versatility and manufacturing convenience.

Figure 7A:
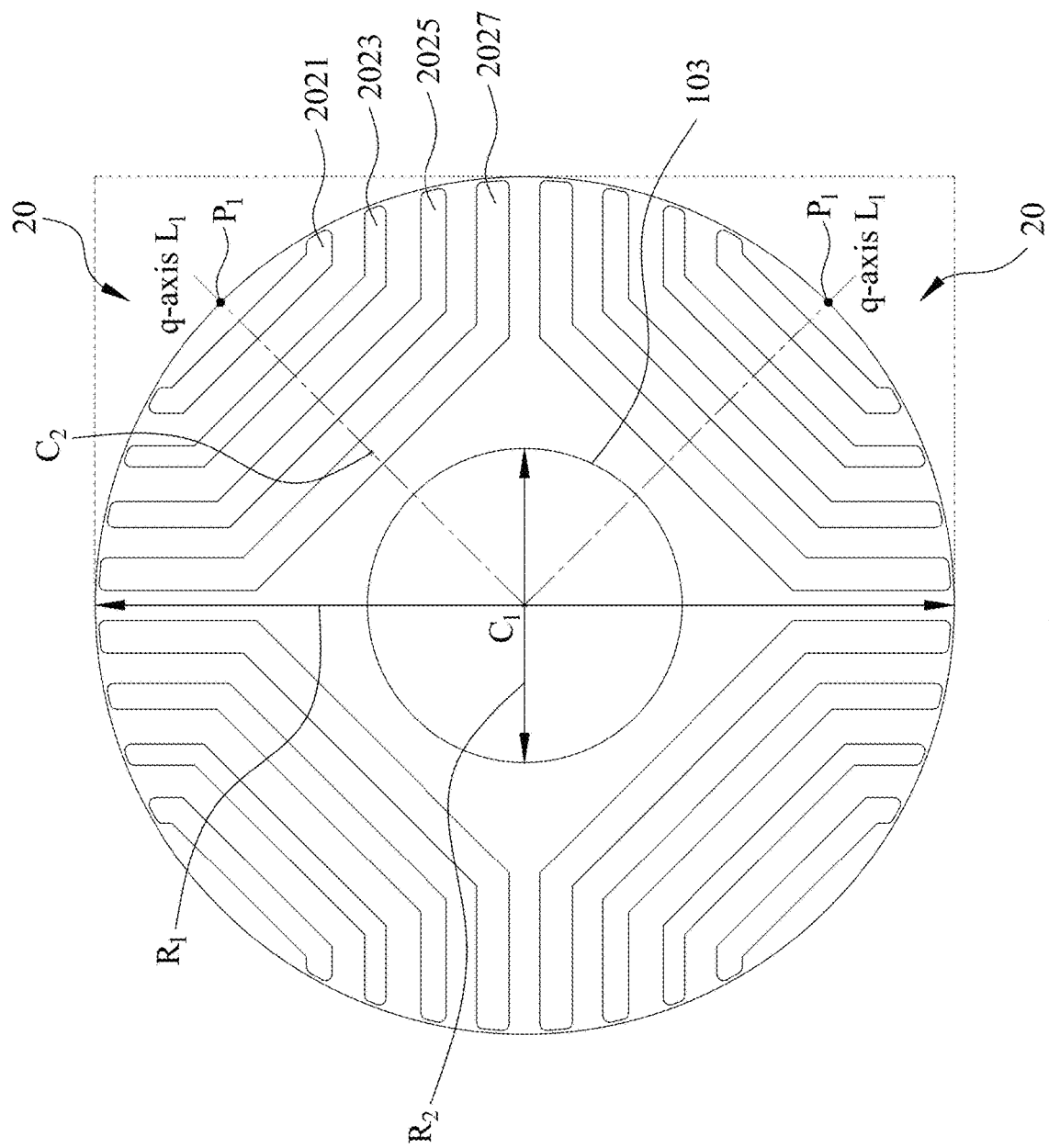
FIG. 7a is a schematic structural view of a U-type motor rotor according to an embodiment of the present invention.
Figure 7B:
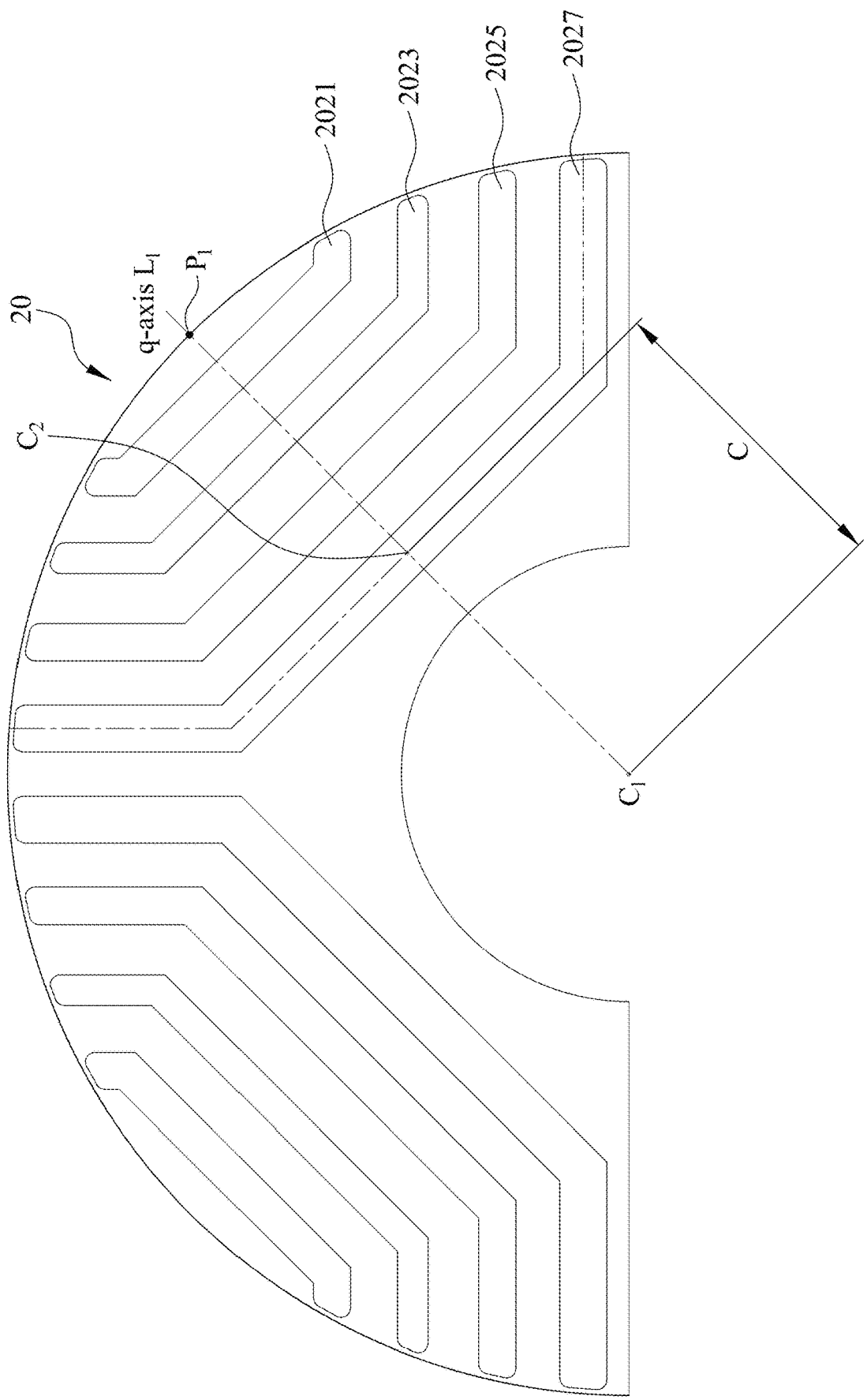
FIG. 7b is a schematic structural view of the center distance of the U-type motor rotor according to an embodiment of the present invention.

FIG. 7a is a schematic view for illustrating the structure of the motor rotor according to an embodiment of the present invention; FIG. 7b is a schematic view for illustrating the structure of the center distance of the motor rotor according to an embodiment of the present invention. As shown in FIGS. 1, 2, 7a, and 7b, in an embodiment of the present invention, the motor rotor 1 includes a diameter R1, the inner hole 103 of the motor rotor includes a diameter R2, and each reluctance part 20 includes a q-axis L1. The q-axis L1 is connected to a center C1 of the inner hole 103 of the motor rotor and a middle point P1 on a peripheral edge of the rotor core 10, and each reluctance part 20 includes a plurality of flux barriers, such as a flux barrier 2021, a flux barrier 2023, a flux barrier 2025, and a flux barrier 2027. In each reluctance part 20, the flux barriers include a closest flux barrier closest to the inner hole 103 of the motor rotor. Taking FIG. 7a and FIG. 7b as an example, the flux barrier 2027 is the closest flux barrier. The q-axis L1 will pass through the center of the closest flux barrier, which is the center C2 of the closest flux barrier 2027. In other words, the flux barrier closest to the inner hole 103 has an intersection with the q-axis L1 and C2 is the center point of the intersection. A center distance C between the closest flux barrier center C2 and the center C1 includes a center distance coefficient CD, the formula of center distance $$C = \frac{CD \cdot R_1 + (1 - CD)R_2}{2},$$

and the center distance coefficient CD conforms to the following relation: 0.15≤CD≤0.3, wherein the center distance coefficient CD is a coefficient specially designed by the present invention to optimize the performance of the motor rotor 1.

It is worth mentioning that if the center distance C and the center distance coefficient CD satisfy the above specifications, the torque ripple can be effectively reduced while maintaining the torque, so as to reduce the vibration of the motor caused by torque fluctuation.

Figure 8A:
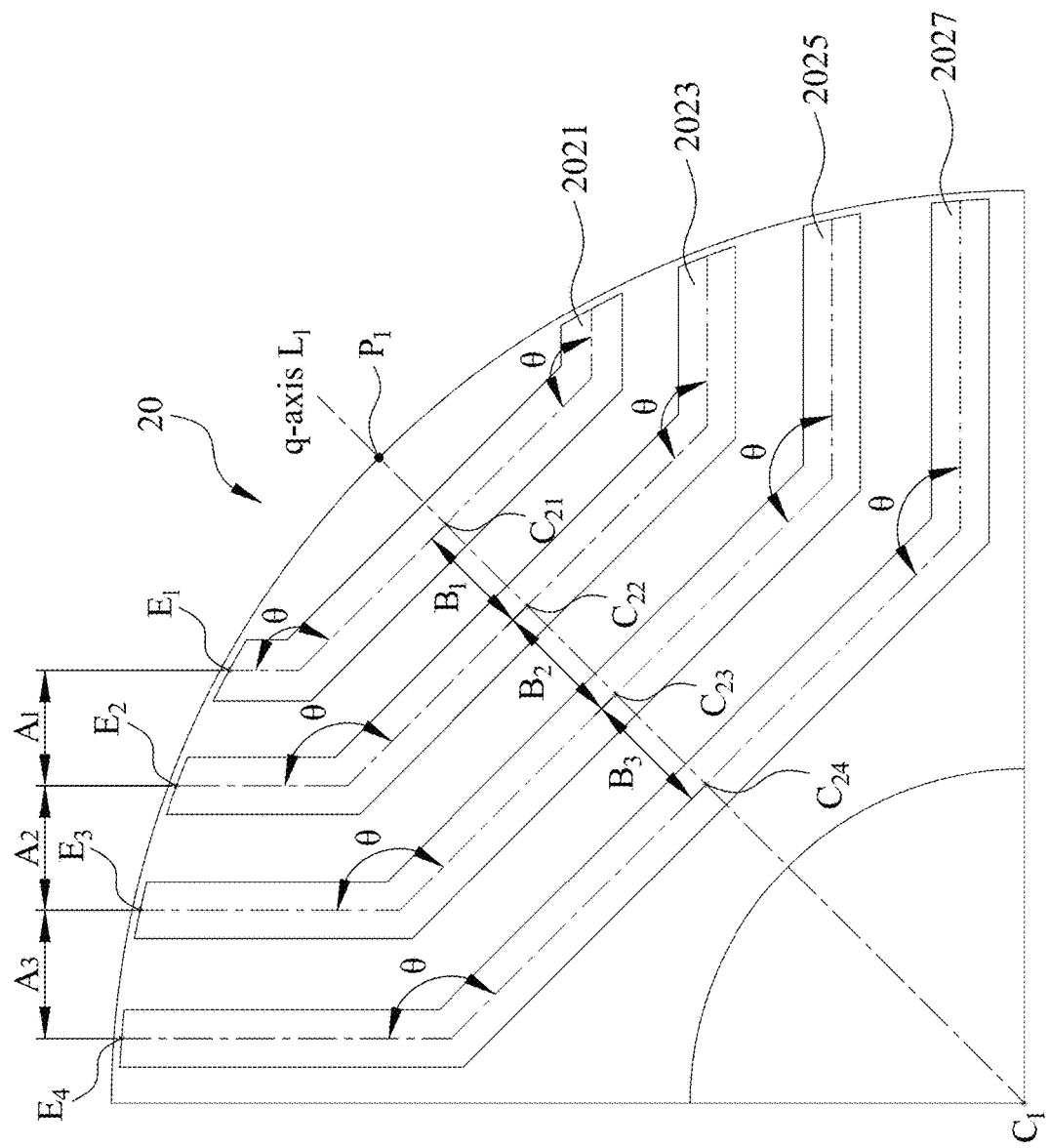
FIG. 8a is a schematic structural view of the spacing between flux barriers in a U-type motor rotor according to an embodiment of the present invention.

FIG. 8a is a schematic view for explaining the structure of the spacing between the flux barriers in the motor rotor according to an embodiment of the present invention, wherein FIG. 8a shows only one set of the reluctance parts 20. Referring to FIGS. 1, 2, and 8a, in an embodiment of the present invention, each reluctance part 20 includes a q-axis L1, and the q-axis L1 is connected to a center C1 of the inner hole 103 of the motor rotor and a middle point P1 on a peripheral edge of the rotor core 10, and each reluctance part 20 includes a plurality of flux barriers 201, the number of flux barriers 201 is K, K is any natural number. In each reluctance part 20, the K-th flux barrier in the flux barrier 201 includes a K-th flux barrier has a K-th flux barrier end, the (K−1)th flux barrier has a (K−1)th flux barrier end, and the distance between the K-th flux barrier end and the (K−1)th flux barrier end is a distance $A_{k-1}$, the q-axis L1 passes through a K-th flux barrier center of the K-th flux barrier, and the q-axis L 1 passes through a (K−1)th flux barrier center of the (K−1)th flux barrier, the distance between the K-th flux barrier center and the (K−1)th flux barrier center is a distance $B_{k-1}$, and the distance $A_{k-1}$ is equal to the distance $B_{k-1}$. In the present invention, the distance $A_{k-1}$ is set to be equal to the distance $B_{K-1}$, so that the motor can achieve the best performance.

Similarly, in the flux barriers 201, the (K−1)th flux barrier has a (K−1)th flux barrier end, and the (K−2)th flux barrier has a (K−2)th flux barrier end. The distance between the (K−1)th flux barrier end and the (K−2)th flux barrier end is a distance $A_{k-2}$. The q-axis L1 passes through a (K−1)th flux barrier center of the (K−1)th flux barrier, the q-axis L1 passes through a (K−2)th flux barrier center of the (K−2)th flux barrier, and the center distance between the (K−1)th flux barrier center and the (K−2)th flux barrier is a distance $B_{k-2}$. The distance $A_{k-2}$ is equal to the distance $B_{k-2}$. In the present invention, the distance $A_{K-2}$ is set to be equal to the distance $B_{K-2}$, so that the motor can achieve the best performance.

Taking FIG. 8a as an example, the number K of flux barriers is 4, namely flux barriers 2021, flux barriers 2023, flux barriers 2025, and flux barriers 2027. The first flux barrier 2021 includes a first flux barrier end E1, the second flux barrier 2023 includes a second flux barrier end E2, the third flux barrier 2025 includes a third flux barrier end E3, and the fourth flux barrier 2027 includes a fourth flux barrier end E4. The distance between the fourth flux barrier end E4 and the third flux barrier end E3 is the distance $A_3$, the distance between the third flux barrier end E3 and the second flux barrier end E2 is the distance $A_2$, and the distance between the second flux barrier end E2 and the first flux barrier end E2 is $A_1$, and so on. In other words, each flux barrier 2021, 2023, 2025 or 2027 in the reluctant part 20 has an edge center point E1, E2, E3 or E4 respectively near the peripheral edge of the rotor core 10, and A1, A2, or A3 is the distance between the edge center points of two adjacent flux barriers.

Furthermore, the q-axis L1 passes through a first flux barrier center C21 of the first flux barrier 2021, the q-axis L1 passes through a second flux barrier center C22 of the second flux barrier 2023, the q-axis L1 passes through a third flux barrier center C23 of the third flux barrier 2025, and the q-axis L1 passes through a fourth flux barrier center C24 of the fourth flux barrier 2027. The distance between the first flux barrier center C21 and the second flux barrier center C22 is a distance $B_1$, and the distance between the second flux barrier center C22 and the third flux barrier center C23 is a distance $B_2$, the distance between the third flux barrier center C23 and the fourth flux barrier center C24 is a distance $B_3$, and so on. In other words, in the present invention, each flux barrier 2021, 2023, 2025 or 2027 in the reluctant part 20 has an intersection with the q-axis L1, C21, C22, C23 or C24 respectively is a middle center point at each intersection, and B1, B2, or B3 is the distance between the middle center points of two adjacent flux barriers. The distance between the ends of any two flux barriers is equal to the distance between the centers of the two flux barriers, that is, the distance $A_1$ is equal to the distance $B_1$, the distance $A_2$ is equal to the distance $B_2$, and the distance $A_3$ is equal to the distance $B_3$, so that the rotational performance of the motor rotor 1 can be optimized, and the distance $A_1$, the distance $B_1$, the distance $A_2$, the distance $B_2$, the distance $A_3$, and the distance $B_3$ are the distances between adjacent flux barriers.

In addition, as shown in FIG. 8a, when the flux barrier is a U-type flux barrier, each flux barrier has a plurality of flux barrier leg angles θ, and the flux barrier leg angle θ is between 100° and 150°, so that the motor rotor 1 can achieve optimal performance.

Figure 8B:
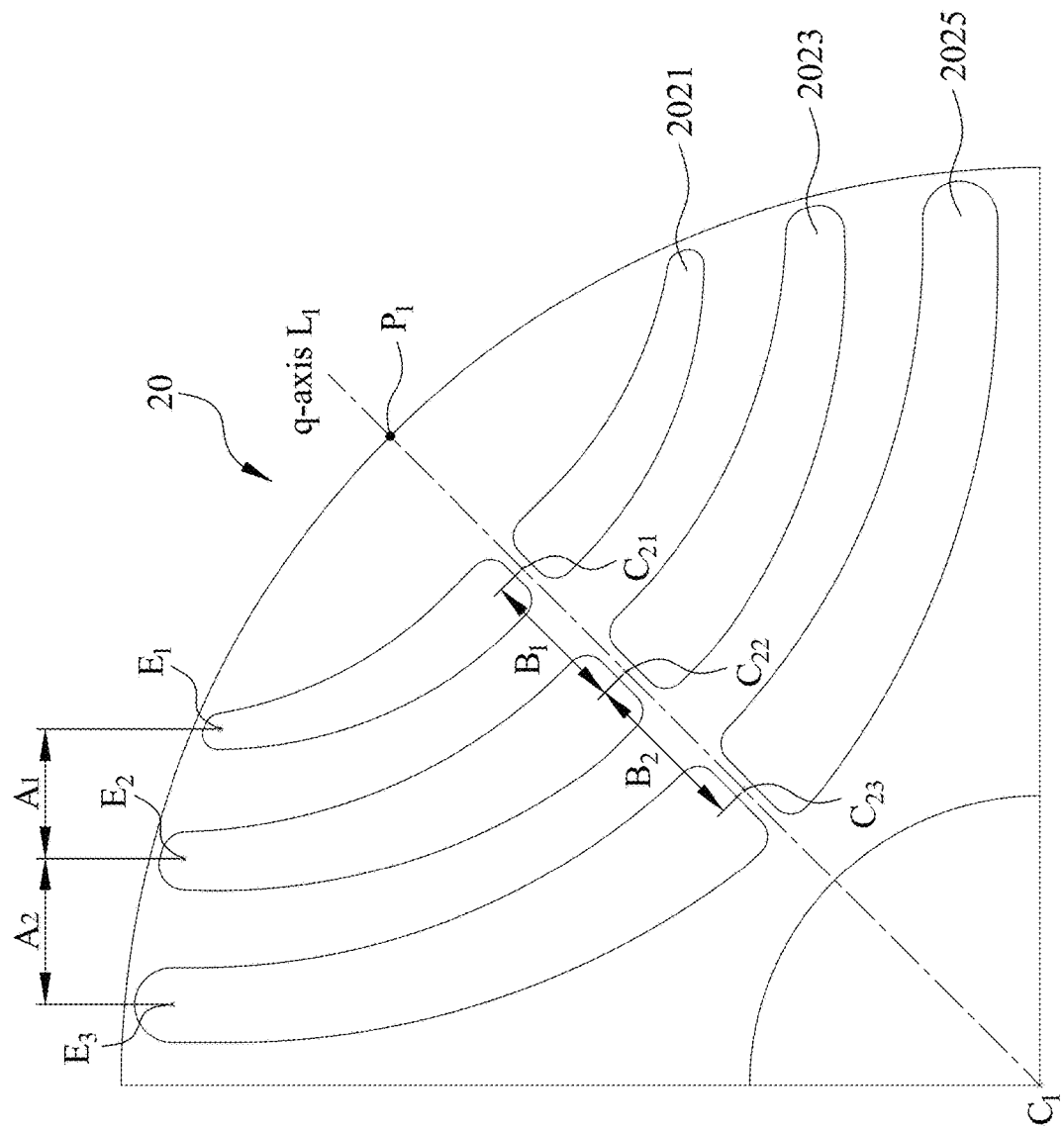
FIG. 8b is a schematic structural view of the spacing between flux barriers in a C-type motor rotor according to another embodiment of the present invention.

FIG. 8b is a schematic view for illustrating the structure of the spacing between the flux barriers in the motor rotor according to another embodiment of the present invention, wherein FIG. 8b only shows one set of the reluctance parts 20. Referring to FIG. 8b, in another embodiment of the present invention, the number K of flux barriers is 3, namely flux barrier 2021, flux barrier 2023, and flux barrier 2025, and these flux barriers are C-type flux barriers. The C-type flux barrier also has the first flux barrier end E1, the second flux barrier end E2, the third flux barrier end E3, the first flux barrier center C21, the second flux barrier center C22, and the third flux barrier center C23. Also, the distance $A_1$ between the ends of the flux barriers is equal to the distance $B_1$ between the centers of the flux barriers; the distance $A_2$ between the ends of the flux barriers is the same as the distance $B_2$ between the ends of the flux barriers.

Figure 8C:
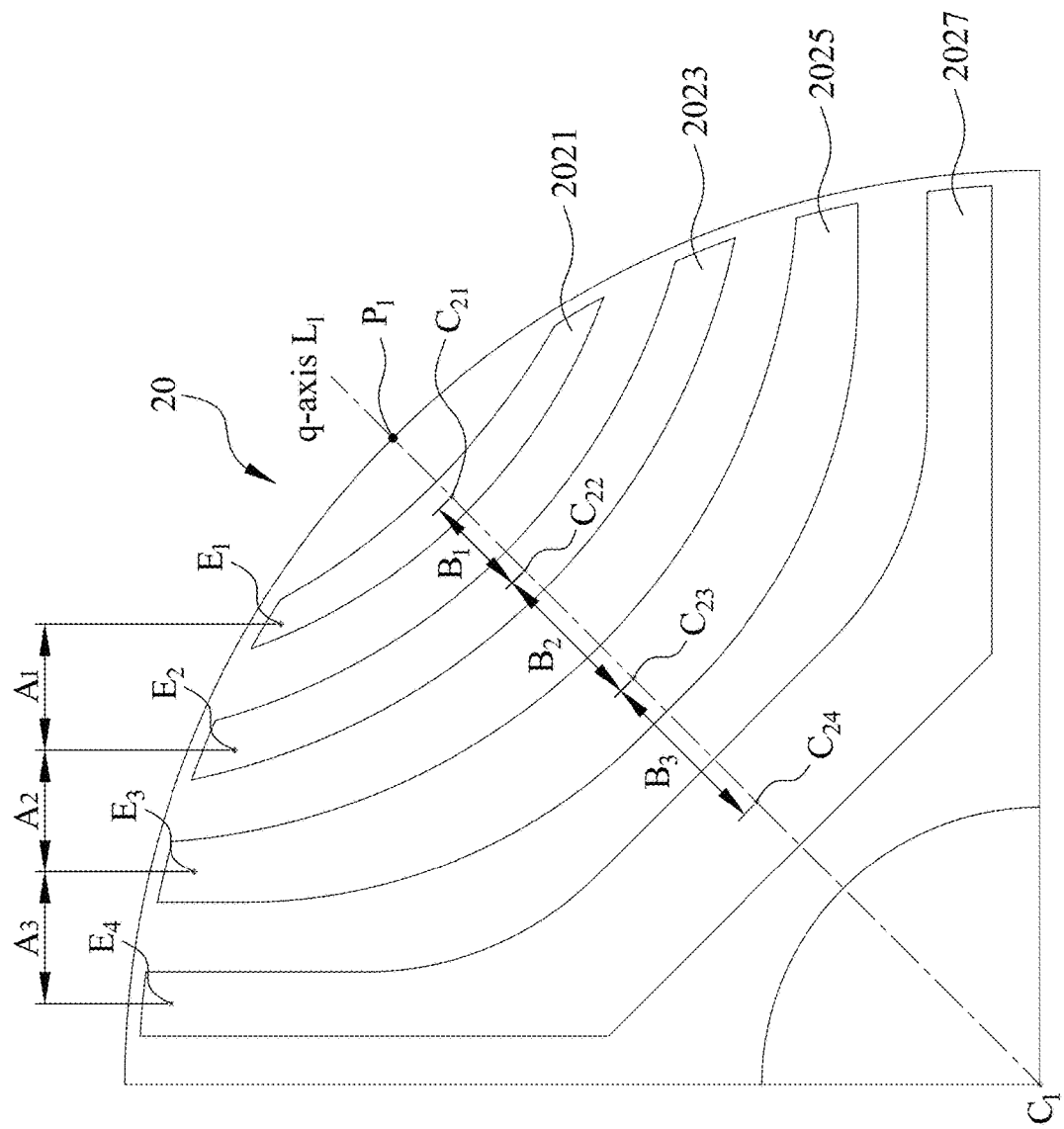
FIG. 8c is a schematic structural view of the spacing between flux barriers in a hybrid motor rotor according to another embodiment of the present invention.

FIG. 8c is a schematic view for illustrating the structure of the spacing between the flux barriers in the motor rotor according to another embodiment of the present invention, wherein FIG. 8c shows only one set of the reluctance parts 20. Refer to FIG. 8c. In another embodiment of the present invention, the number K of flux barriers is 4, namely flux barrier 2021, flux barrier 2023, flux barrier 2025, and flux barrier 2027; and flux barriers 2021, the flux barrier 2023, and the flux barrier 2025 are C-type flux barriers, but the flux barrier 2027 is a U-type flux barrier, so these flux barriers are hybrid flux barriers. In this structure, the hybrid flux barriers also have the first flux barrier end E1, the second flux barrier end E2, the third flux barrier end E3, and the first flux barrier end E4; as well as, the flux barrier center C21, the second flux barrier center C22, the third flux barrier center C23, and the fourth flux barrier center C24. The distance $A_1$ between the ends of the flux barriers and the distance $B_1$ between the ends the center of the flux barriers are equal; the distance $A_2$ between the ends of the flux barriers is equal to the distance $B_2$ between the centers of the flux barriers; the distance $A_3$ between the ends of the flux barriers is equal to the distance $B_3$ between the centers of the flux barriers.

Therefore, it can be seen from the above description that the distance between the ends of any two adjacent flux barriers is equal to the distance between the centers of the two adjacent flux barriers, which is a feature applicable to C-typed, U-typed flux barriers or other types of flux barriers.

Figure 9:
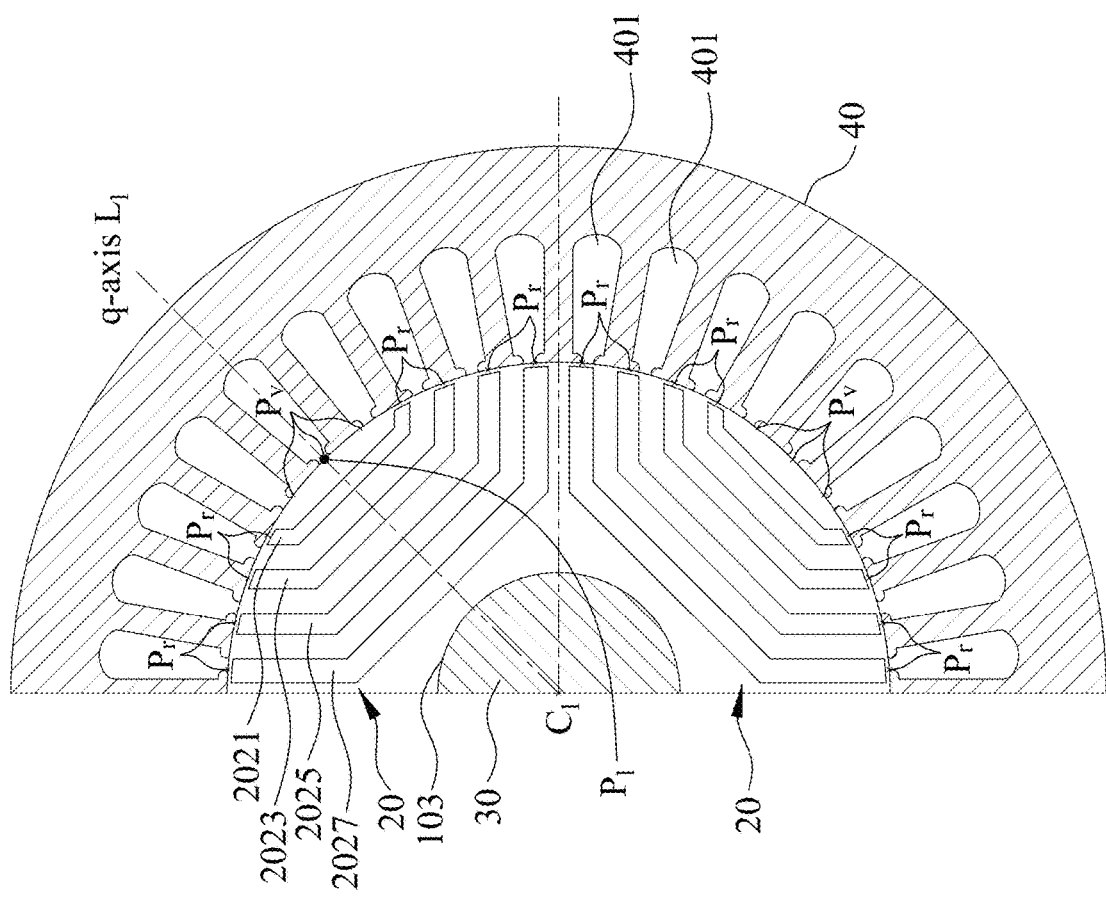
FIG. 9 is a schematic structural view of a U-type motor rotor and a motor stator according to an embodiment of the present invention.

FIG. 9 is a schematic view for illustrating the structure of the motor rotor and the motor stator according to an embodiment of the present invention, wherein only half of the motor rotor and the motor stator structure are shown in FIG. 9. Referring to FIGS. 1 and 9, in an embodiment of the present invention, the reluctance motor includes a motor rotor 10 and a motor stator 40. The motor stator 40 includes a plurality of slots 401 and a plurality of motor pole numbers P. The number of slots 401 is Ns, and each motor pole number P contains an $n_{PPS}$ number of slots 401. The $n_{PPS}$ number is the number of slots 401 divided by the motor pole number P, and the formula is $n_{PPS}$=Ns/P. In addition, the motor rotor 1 also includes a plurality of reluctance parts 20, and each reluctance part 20 includes a plurality of flux barriers, such as flux barrier 2021, flux barrier 2023, flux barrier 2025, flux barrier 2027. In the present embodiment, the total number of flux barriers included in a reluctance part 20 is set as the number K, and the number K conforms to the following relation $$\left\lfloor \frac{n_{PPS} - 2}{2} \right\rfloor \leq K \leq \left\lfloor \frac{n_{PPS} + 2}{2} \right\rfloor,$$

where K is a natural number, so that each reluctance part 20 can include an optimal number of flux barriers, and the performance of the motor rotor 1 can be optimized.

On the other hand, each rotor pole in the motor rotor 1 also includes a plurality of equivalent rotor nodes, and the total number of equivalent rotor nodes is $n_{PPR}$. The equivalent rotor node is a selectable position point for the flux barrier end, and can be divided into a real node Pr and a virtual node Pv. The real node Pr is the selected position of the flux barrier end, and the flux barrier is formed by extending between the two real nodes Pr. The virtual node Pv is an unselected node position, and when the motor rotor 1 rotates, torque fluctuation are generated due to cogging and other reasons. Wherein, in order to minimize the torque ripple, the total number of equivalent rotor nodes $n_{PPR}$ and the angle α between the nodes must conform to the following relation:

$$n_{PPR} = n_{PPS} + 2 \text{ and } \alpha = \frac{2\pi}{P \cdot n_{PPR}}.$$

It can be seen from the above description that the structure of the motor rotor of the present invention include the following major features: 1. The flux barrier ratio characteristics in the motor rotor; 2. The area ratio difference of the flux barriers between each flux barrier in the motor rotor; 3. The distance between the center of the closest flux barrier in the motor rotor and the center of the motor rotor; 4. The characteristic of the distance between the flux barrier ends and the distance between the flux barrier centers of the motor rotor. The motor rotor structure of the present invention can improve the power density of the motor and effectively reduce the torque ripple, so as to reduce the vibration of the motor caused by the torque fluctuation.

Figure 10:
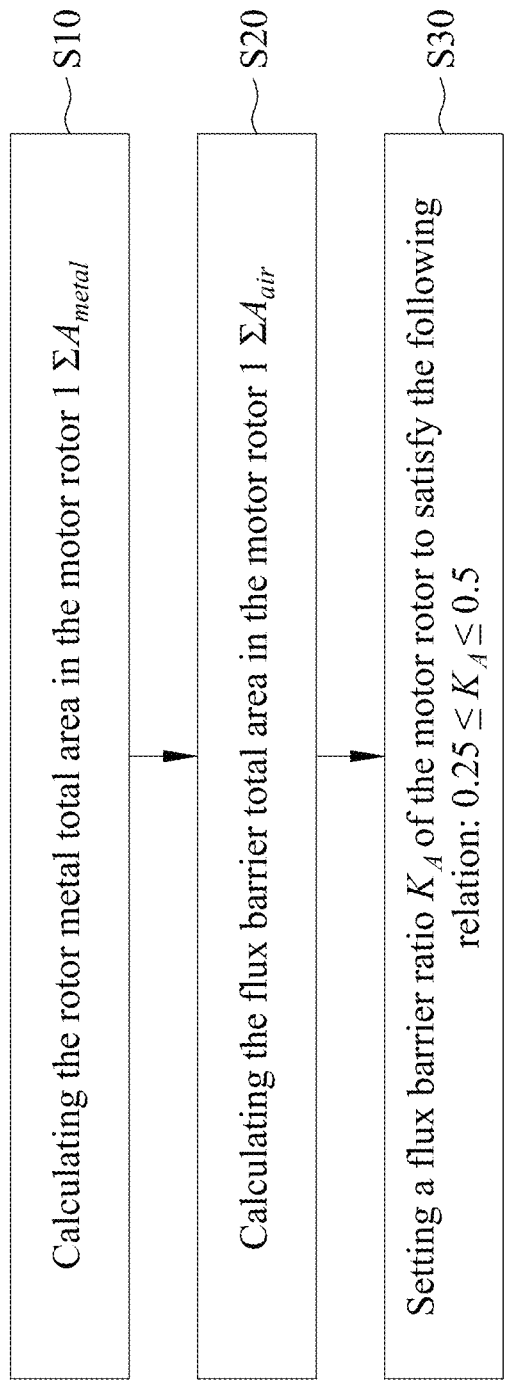
FIG. 10 is a flowchart of a method for designing a motor rotor according to an embodiment of the present invention.

FIG. 10 is a flow chart for explaining a design method of a motor rotor according to an embodiment of the present invention. Referring to FIG. 1, FIG. 2, FIG. 3, and FIG. 10, an embodiment of the present invention also provides a method for designing a motor rotor, which includes the following steps: Step S10: Calculating the rotor metal total area $\Sigma A_{metal}$ in the motor rotor 1, the rotor metal total area is the total of the areas of the metal parts 101; Step S20: Calculating the flux barrier total area $\Sigma A_{air}$ in the motor rotor 1, the flux barriers total area is the sum of the areas of the flux barriers 201; and step S30: setting a flux barrier ratio $K_A$ of the motor rotor 1 to satisfy the following relation: $0.25 \leq K_A \leq 0.5$, wherein the formula of the flux barrier ratio $K_A$ is $$K_A = \frac{\sum A_{air}}{\sum A_{air} + \sum A_{metal}}.$$

Figure 11:
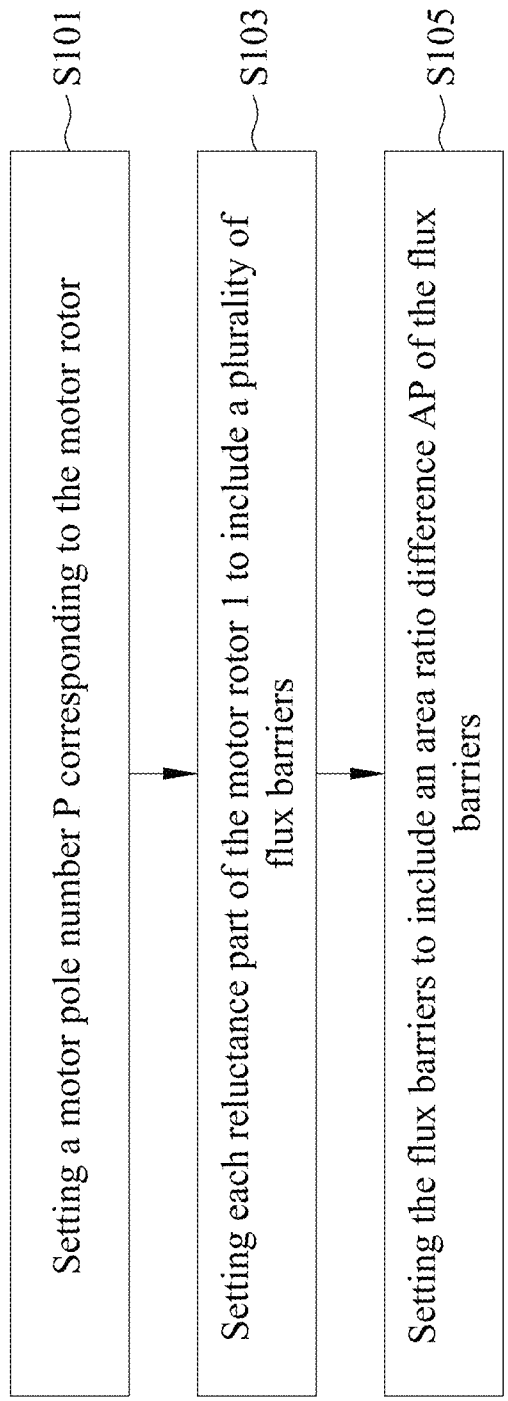
FIG. 11 is a flowchart of a method for designing a motor rotor according to another embodiment of the present invention.

FIG. 11 is a flow chart for explaining a design method of a motor rotor according to another embodiment of the present invention. Referring to FIG. 1, FIG. 2, and FIG. 11, in another embodiment of the present invention, the design method further includes the following steps: step S101: setting a motor pole number P corresponding to the motor rotor 1; step S103: setting each reluctance part 20 of the motor rotor 1 to include a plurality of flux barriers 201, wherein the total number of flux barriers 201 is K, and K is any natural number greater than 1; and step S105: setting the flux barriers 201 to include an area ratio difference AP of the flux barriers, the flux barrier area ratio difference AP conforming to the following relation $$\frac{P}{K} \times 15 - 9 \leq AP \leq \frac{P}{K} \times 15 - 3.$$

Figure 12:
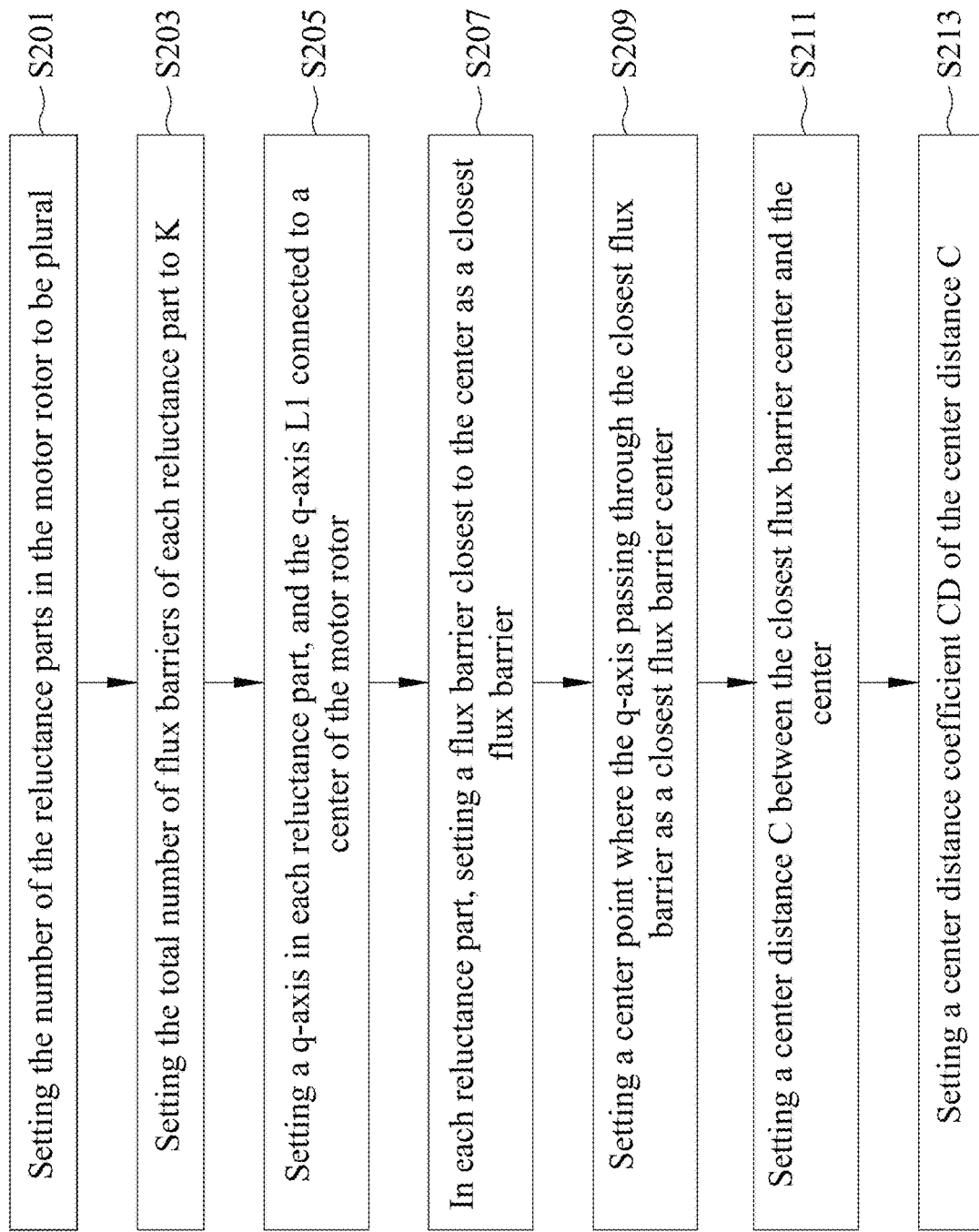
FIG. 12 is a flowchart of a design method of a motor rotor according to another embodiment of the present invention.

FIG. 12 is a flow chart for explaining a design method of a motor rotor according to another embodiment of the present invention. Refer to FIGS. 1, 2, 7a, 7b, and 12. In yet another embodiment of the present invention, the design method further includes the following steps: Step S201: setting the number of the reluctance parts 20 in the motor rotor 1 to be plural, wherein the motor rotor 1 has a diameter R1, and an inner hole 103 of the motor rotor of the motor rotor 1 has a diameter R2; Step S203: setting the total number of flux barriers 201 of each reluctance part 20 to K, where K is any natural number; Step S205: setting a q-axis L1 in each reluctance part 20, and the q-axis L1 being connected to a center C1 of the motor rotor 1 and a middle point P1 on a peripheral edge of the rotor core 10; Step S207: in each reluctance part 20, setting a flux barrier closest to the center C1 as a closest flux barrier, for example, the flux barrier 2027 shown in FIG. 7b as the closest flux barrier; Step S209: setting a center point where the q-axis L1 passing through the closest flux barrier as a closest flux barrier center C2; Step S211: setting a center distance C between the closest flux barrier center C2 and the center C1, and setting the formula of the center distance C as $$C = \frac{CD \cdot R_1 + (1-CD)R_2}{2};$$

and step S213: setting a center distance coefficient CD of the center distance C, the center distance coefficient CD complying with the following relation: 0.15≤CD<0.3.

Figure 13:
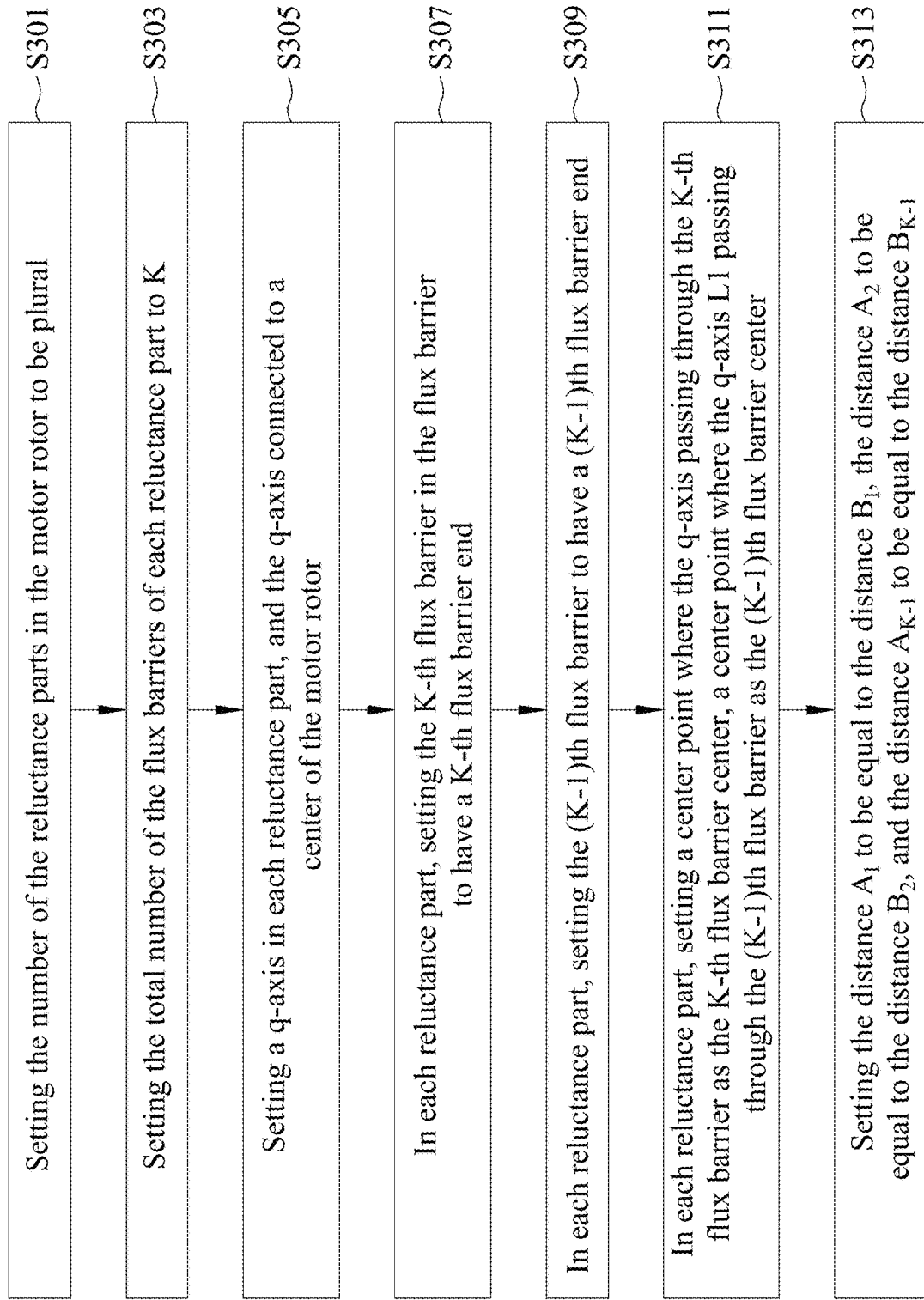
FIG. 13 is a flowchart of a design method of a motor rotor according to yet another embodiment of the present invention.

FIG. 13 is a flowchart for explaining a design method of a motor rotor according to yet another embodiment of the present invention. Refer to FIG. 1, FIG. 2, FIGS. 8a to 8c, and FIG. 13. In yet another embodiment of the present invention, the design method further includes the following steps: Step S301: setting the number of the reluctance parts 20 in the motor rotor 1 to a plurality; Step S303: setting the total number of the flux barriers 201 of each reluctance part 20 to K, and K being any natural number; Step S305: setting a q-axis L1 in each reluctance part 20, and the q-axis L1 being connected to a center C1 of the motor rotor 1 and a middle point P1 on a peripheral edge of the rotor core 10; Step S307: in each reluctance part 20, setting the K-th flux barrier in the flux barrier to have a K-th flux barrier end; for example, in FIG. 8a, K is equal to 4, therefore, the first flux barrier 2021, the second flux barrier 2023, the third flux barrier 2025, and the fourth flux barrier 2027 are set; Step S309: in each reluctance part 20, setting the (K−1) th flux barrier to have a (K−1) th flux barrier end; for example, in FIG. 8a, the first flux barrier 2021 has the first flux barrier end E1, and the second flux barrier 2023 has the second flux barrier end E2, and so on, wherein the distance between the K-th flux barrier end and the (K−1) th flux barrier end is a distance $A_{K-1}$; for example, the distance between the first flux barrier end E1 and the second flux barrier end E2 is the distance $A_1$, and the distance between the second flux barrier end E2 and the third flux barrier end E3 is the distance $A_2$, and so on; Step S311: in each reluctance part 20, setting a center point where the q-axis L1 passing through the K-th flux barrier as the K-th flux barrier center, a center point where the q-axis L1 passing through the (K−1)th flux barrier as the (K−1)th flux barrier center; for example, the point where the q-axis L1 passes through the center of the first flux barrier is a first flux barrier center C21; the point where the q-axis L1 passes through the center of the second flux barrier is a second flux barrier center C22, and so on; wherein the distance between the center of the K-th flux barrier and the center of the (K−1)th flux barrier is a distance $B_{K-1}$; for example, the distance between the first flux barrier center C21 and the second flux barrier center C22 is a distance $B_1$, and the second flux barrier center C22 and the distance between the third flux barrier centers C23 is a distance $B_2$, and so on; and Step S313: setting the distance $A_1$ to be equal to the distance $B_1$, the distance $A_2$ to be equal to the distance $B_2$, and the distance $A_{K-1}$ to be equal to the distance $B_{K-1}$.

Figure 14:
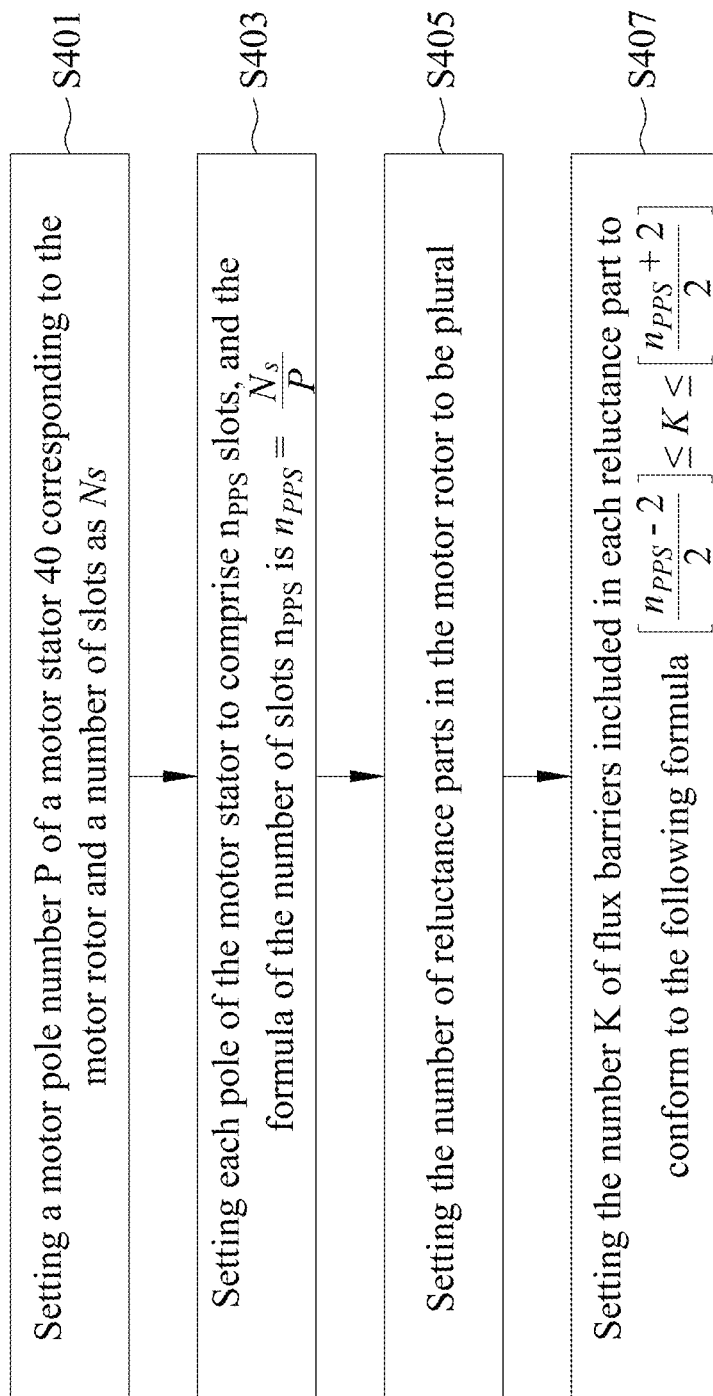
FIG. 14 is a flowchart of a design method of a motor rotor according to yet another embodiment of the present invention.

FIG. 14 is a flow chart for explaining a design method of a motor rotor according to yet another embodiment of the present invention. Refer to FIG. 1, FIG. 2, FIG. 9, and FIG. 14. In yet another embodiment of the present invention, the design method further includes the following steps: Step S401: setting a motor pole number P of a motor stator 40 corresponding to the motor rotor 1 and a number of slots as Ns, Ns is the number of slots 401; Step S403: setting each pole of the motor stator 40 to comprise $n_{PPS}$ slots, and the formula of the number of slots $n_{PPS}$ is $$n_{PPS} = \frac{N_s}{P};$$

Step S405: setting the number of reluctance parts 20 in the motor rotor 1 to plural; Step S407: setting the number K of flux barriers 201 included in each reluctance part 20 to conform to the following formula $$\left\lfloor \frac{n_{PPS}-2}{2} \right\rfloor \leq K \leq \left\lfloor \frac{n_{PPS}+2}{2} \right\rfloor,$$

where K is a natural number.

As can be seen from the above design method, the design method of the present invention includes the following major features: 1. The flux barrier ratio characteristics in the motor rotor; 2. The area ratio difference of the flux barriers between each flux barrier in the motor rotor; 3. The distance between the center of the closest flux barrier in the motor rotor and the center of the motor rotor; 4. The characteristic of the distance between the flux barrier ends and the distance between the flux barrier centers of the motor rotor.; 5. The number of flux barriers included in each reluctance part in the motor rotor. When implementing the design method of the present invention, one of the above-mentioned features can be individually designed, so that the performance of the motor rotor can be improved, and multiple features can be applied together to achieve the optimized performance of the motor rotor. Furthermore, the design method of the present invention is simple and effective, which can greatly reduce the design time, and the design method of the present invention can effectively improve the power density of the motor and reduce the torque ripple, and then make fine adjustments through the design parameters of the present invention, so that the optimal design of the rotor can achieve the maximum benefit in the shortest time. Hence, the reluctance motor has the best performance. In addition, the motor rotor type applicable to the design method of the motor rotor of the present invention may be one of C-type rotors, U-type rotors, hybrid rotors or other types of rotors.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A motor rotor, comprising:
a rotor core having a plurality of metal parts and an inner hole for the motor rotor, the inner hole passing through the rotor core, and areas of all the metal parts forming a rotor metal total area $\Sigma A_{metal}$;

a plurality of reluctance parts surrounding the inner hole, each of the reluctance parts comprising a plurality of flux barriers penetrating through the rotor core, each flux barrier in a reluctance part having an area ratio which is a ratio of an area of the flux barrier to areas of all the flux barriers in the reluctance part, and the area ratios of the flux barriers in the reluctance part increasing sequentially as an arithmetic progression sequence along a direction from a periphery of the motor rotor to the inner hole for optimizing performance of the motor rotor;

wherein areas of the flux barriers in all of the reluctance parts form a flux barrier total area $\Sigma A_{air}$, and a flux barrier ratio $K_A$ is expressed as $$K_A = \frac{\sum A_{air}}{\sum A_{air} + \sum A_{metal}}.$$

and satisfies $0.25 \leq K_A \leq 0.5$ for optimizing the performance of the motor rotor.

2. The motor rotor according to claim 1, wherein the motor rotor corresponds to a motor stator comprising P motor poles, a total number of the flux barriers in a reluctance part is K, and a flux barrier area ratio difference AP between the area ratios of two adjacent flux barriers in the reluctance part satisfies $$\frac{P}{K} \times 15 - 9 \leq AP \leq \frac{P}{K} \times 15 - 3.$$

for optimizing the performance of the motor rotor.

3. The motor rotor according to claim 1, wherein the motor rotor has a diameter $R_1$, the inner hole has a diameter $R_2$, the plurality of flux barriers in each reluctance part are formed symmetrically with respect to a q-axis that connects a center of the inner hole and a middle point on a peripheral edge of the rotor core in the reluctance part, the flux barrier closest to the center hole in the reluctant part has an intersection with the q-axis, and a distance C between a center point of the intersection and the center of the inner hole satisfies the following relation:

$$C = \frac{CD \cdot R_1 + (1 - CD)R_2}{2};$$

CD being a coefficient with $0.15 \leq CD < 0.3$ for optimizing the performance of the motor rotor.

4. The motor rotor according to claim 1, wherein the plurality of flux barriers in each reluctance part are formed symmetrically with respect to a q-axis that connects a center of the inner hole and a middle point on a peripheral edge of the rotor core in the reluctance part, each flux barrier in the reluctant part has a middle center point at an intersection of the q-axis and the flux barrier and an edge center point near the peripheral edge of the rotor core, and a distance between the middle center points of two adjacent flux barriers is equal to a distance between the edge center points of the two adjacent flux barriers for optimizing the performance of the motor rotor.

5. A method for designing a motor rotor, the motor rotor having a rotor core and a plurality of reluctance parts, the rotor core having a plurality of metal parts and an inner hole for the motor rotor, the inner hole passing through the rotor core, the plurality of reluctance parts surrounding the inner hole and each of the reluctance parts having a plurality of flux barriers penetrating through the rotor core, the method comprising the steps of:

defining an area ratio for each flux barrier in a reluctance part as a ratio of an area of the flux barrier to areas of all the flux barriers in the reluctance part;

adjusting the area of each flux barrier in each reluctance part so that the area ratios of the flux barriers in the reluctance part increase sequentially as an arithmetic sequence along a direction from a periphery of the motor rotor to the inner hole for optimizing performance of the motor rotor;

calculating areas of all the metal parts of the rotor core as a rotor metal total area $\Sigma A_{metal}$;

calculating the areas of the flux barriers in all the reluctance parts as a flux barrier total area $\Sigma A_{air}$; and ensuring that a flux barrier ratio $K_A$ expressed as $$K_A = \frac{\sum A_{air}}{\sum A_{air} + \sum A_{metal}}$$

satisfies $0.25 \leq K_A \leq 0.5$ for optimizing the performance of the motor rotor.

6. The method for designing a motor rotor according to claim 5, wherein the motor rotor corresponds to a motor stator comprising P motor poles, the method further selecting a number K as the number of flux barriers in each reluctance part and ensuring that a flux barrier area ratio difference AP between the area ratios of two adjacent flux barriers satisfies $$\frac{P}{K} \times 15 - 9 \leq AP \leq \frac{P}{K} \times 15 - 3.$$

for optimizing the performance of the motor rotor.

7. The method for designing a motor rotor according to claim 5, wherein the motor rotor has a diameter $R_1$ and the inner hole has a diameter $R_2$, the method further comprising the steps of:

ensuring that the plurality of flux barriers in each reluctance part are formed symmetrically with respect to a q-axis that connects a center of the inner hole and a middle point on a peripheral edge of the rotor core in the reluctance part;

identifying a center point at an intersection of the q-axis and the flux barrier closest to the center hole in the reluctance part; and ensuring that a center distance C between the center of the inner hole and the center point satisfies $$C = \frac{CD \cdot R_1 + (1 - CD)R_2}{2},$$

CD being a coefficient with $0.15 \leq CD \leq 0.3$ for optimizing the performance of the motor rotor.

8. The method for designing a motor rotor according to claim 5, further comprising the steps of:

ensuring that the plurality of flux barriers in each reluctance part are formed symmetrically with respect to a q-axis that connects a center of the inner hole and a middle point on a peripheral edge of the rotor core in the reluctance part;

identifying a middle center point for each flux barrier in the reluctant part at an intersection of the q-axis and the flux barrier;

identifying an edge center point for each flux barrier in the reluctant part near the peripheral edge of the rotor core; and ensuring that a distance between the middle center points of two adjacent flux barriers is equal to a distance between the edge center points of the two adjacent flux barriers for optimizing the performance of the motor rotor.

9. The method for designing a motor rotor according to claim 5, wherein the motor rotor corresponds to a motor stator comprising P motor poles and $N_s$ stator slots, and each motor pole has $n_{pps}$ stator slots with $$n_{PPS} = \frac{N_s}{P};$$

the method further selecting a number K as the number of flux barriers in each reluctance part and ensuring that the number K satisfies $$\left\lfloor \frac{n_{PPS} - 2}{2} \right\rfloor \leq K \leq \left\lfloor \frac{n_{PPS} + 2}{2} \right\rfloor,$$

for optimizing the performance of the motor rotor.

* * * * *